(12) United States Patent
Takahashi

(10) Patent No.: US 8,565,534 B2
(45) Date of Patent: Oct. 22, 2013

(54) IMAGE PROCESSING APPARATUS AND IMAGE PROCESSING METHOD

(75) Inventor: Katsuyuki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1090 days.

(21) Appl. No.: 11/822,173

(22) Filed: Jul. 3, 2007

(65) Prior Publication Data

US 2008/0137964 A1 Jun. 12, 2008

(30) Foreign Application Priority Data

Dec. 7, 2006 (JP) ................................ 2006-331134

(51) Int. Cl.
*G06K 9/64* (2006.01)
*G06F 17/30* (2006.01)

(52) U.S. Cl.
USPC ........... 382/209; 382/170; 382/305; 382/190; 382/286; 382/306; 358/474

(58) Field of Classification Search
USPC .................. 382/209, 170, 305, 190, 286, 306
See application file for complete search history.

(56) References Cited

U.S. PATENT DOCUMENTS

| | | | |
|---|---|---|---|
| 6,181,818 B1 * | 1/2001 | Sato et al. ...................... | 382/170 |
| 6,247,009 B1 | 6/2001 | Shiiyama et al. | |
| 2004/0220898 A1 | 11/2004 | Eguchi et al. ...................... | 707/1 |
| 2004/0246532 A1 | 12/2004 | Inada | |
| 2005/0210019 A1 * | 9/2005 | Uehara et al. ...................... | 707/3 |
| 2007/0133054 A1 * | 6/2007 | Kobayashi et al. ........... | 358/1.16 |
| 2007/0143272 A1 * | 6/2007 | Kobayashi ........................ | 707/3 |

FOREIGN PATENT DOCUMENTS

| | | |
|---|---|---|
| JP | 07-056929 A | 3/1995 |
| JP | 10-254888 A | 9/1998 |
| JP | 2001-103473 | 4/2001 |
| JP | 2001290838 A | 10/2001 |
| JP | 2002132825 A | 5/2002 |
| JP | 2003167906 A | 6/2003 |
| JP | 2004-094813 | 3/2004 |
| JP | 2004-220267 | 8/2004 |
| JP | 2004-348706 | 12/2004 |
| JP | 2005084865 A | 3/2005 |
| JP | 2005-244684 | 9/2005 |
| JP | 2006301757 A | 11/2006 |
| WO | 2005122579 A1 | 5/2005 |

OTHER PUBLICATIONS

European Search Report in corresponding European Application No. 07111845.9, dated Dec. 19, 2007.
European Search Report dated Aug. 29, 2011 in corresponding European Application No. 07111845.9.
Office Action dated Nov. 21, 2011 in corresponding Japanese Application No. 2006-331134.
Japanese Office Action dated Jul. 9, 2012 in corresponding Japanese Application No. 2006-331134.

\* cited by examiner

*Primary Examiner* — Steven Kau
*Assistant Examiner* — Quang N Vo
(74) *Attorney, Agent, or Firm* — Fitzpatrick, Cella, Harper & Scinto

(57) ABSTRACT

An apparatus (e.g. MFP) calculates the feature amount of a query image. The similarity between the feature amount of each image stored in a storage device and the feature amount of the query image is calculated, thereby obtaining a plurality of candidate images similar to the query image. The display order of the plurality of candidate images is determined on the basis of the job log (log data of processes executed in the past) of a device selected as a reference target.

10 Claims, 25 Drawing Sheets

FIG. 25

| DATE | JOB ID | JOB TYPE | DATE TYPE | DATE LENGTH | IMAGE FEATURE AMOUNT DATA |
|---|---|---|---|---|---|
| | 5001 | COPY | | DATE LENGTH | IMAGE FEATURE AMOUNT DATA |
| | 5001 | COPY | DAOF | DATE LENGTH | IMAGE FEATURE AMOUNT DATA |
| | 5002 | PRINT | DAOF | DATE LENGTH | IMAGE FEATURE AMOUNT DATA |
| | 5002 | PRINT | DAOF | DATE LENGTH | IMAGE FEATURE AMOUNT DATA |

IMAGE PROCESSING APPARATUS AND IMAGE PROCESSING METHOD

BACKGROUND OF THE INVENTION

1. Field of the Invention

The present invention relates to an image search technique.

2. Description of the Related Art

It has become a common practice to digitize paper documents by causing a scanner to read them and store the digital data in a hard disk of a computer or an information processing device. Along with the progress of a compression coding scheme such as JPEG and the growing capacity and reduction in cost of a hard disk, the quantity of stored and managed document image data is increasing. Techniques of searching for a desired image from an enormous number of image contents stored in a hard disk have been proposed.

As a method generally used to search for a desired image from a number of stored image contents, keywords are given to individual image contents in advance, and search is done based on a keyword. Images corresponding to the keyword are displayed on, for example, a monitor as a search result. The operator visually selects the desired image from the displayed images.

As the Internet has recently become popular, such a search method using keywords is commonly practiced in image search systems designed to distribute images to consumers over the Internet prepared by contents providers who have an enormous quantity of image contents.

When search is done on an enormous number of images on the Internet, the search result list may also become large. In this case, to allow the operator to visually select a desired image, as described above, it is necessary to display images similar to the target image or images that seem to be important in descending order of priority. Such a technique is disclosed in Japanese Patent Laid-Open No. 2004-220267, in which the significance of each image is determined from the structure of an HTML document, and the search result display order is decided based on the ranking result of significances.

However, in searching a database storing only document image data, the above-described search based on a keyword and search result display order determination based on a document structure are impossible.

There is proposed a technique of executing search based on image similarity. In Japanese Patent Laid-Open No. 2004-348706, a document image is segmented into a plurality of regions based on attributes, and the similarity of each segmented region is calculated by a search process suitable for its attribute, thereby searching for a similar image. Japanese Patent Application No. 2005-244684 discloses a method of calculating the encoding (image key) of an image to determine the similarity.

Image search based on a similarity allows searching for stored image data from part of an original document or similar images.

In both search based on a keyword and search based on a similarity, however, when the number of search target documents is large, that is, when a document is to be searched for on the Internet or a large document management server, it is difficult to obtain an appropriate number of search results. In keyword search, an enormous number of search results are obtained if a common word is used as a keyword. If the operator increases the number of keywords or uses a special keyword for narrow-down, the number of search results becomes small, but the target document may be excluded from the search results.

In similarity search, to obtain only data with high similarities as search results, the number of parameters for similarity calculation increases, and the calculation speed decreases. On the other hand, if the number of similarity calculation parameters is reduced to speed up the calculation, the search results include even images with low similarities as similar images, resulting in an enormous number of search results. The operator must visually discriminate the large number of images, and the time and labor for search increase.

SUMMARY OF THE INVENTION

The present invention has been made in consideration of the above-described problems, and has as its object to provide a technique of more easily executing image search and presenting an image search result easy for a user to recognize.

According to one aspect of the present invention, an image processing apparatus comprising:

a first calculation unit adapted to calculate a feature amount of a search target image;

a second calculation unit adapted to calculate a similarity between a feature amount of each image stored in a storage device and the feature amount calculated by the first calculation unit, thereby obtaining a plurality of candidate images similar to the search target image; and a display order determination unit adapted to determine a display order of the plurality of candidate images obtained by the second calculation unit on the basis of a log of a device selected as a reference target.

According to another aspect of the present invention, an image processing method executed by an image processing apparatus, comprising:

a first calculation step of calculating a feature amount of a search target image;

a second calculation step of calculating a similarity between a feature amount of each image stored in a storage device and the feature amount calculated in the first calculation step, thereby obtaining a plurality of candidate images similar to the search target image; and a display order determination step of determining a display order of the plurality of candidate images obtained in the second calculation step on the basis of a log of a device selected as a reference target.

Further features of the present invention will become apparent from the following description of exemplary embodiments with reference to the attached drawings.

BRIEF DESCRIPTION OF THE DRAWINGS

FIG. 25 is a view showing a structural example of a log file.

DESCRIPTION OF THE EMBODIMENT

A preferred embodiment of the present invention will be described below in detail with reference to the accompanying drawings. In the embodiment to be described below, specific arrangements are used to explain the present invention in detail. However, the system and apparatus to practice the invention according to the claims can have various arrangements.

Figure 1:
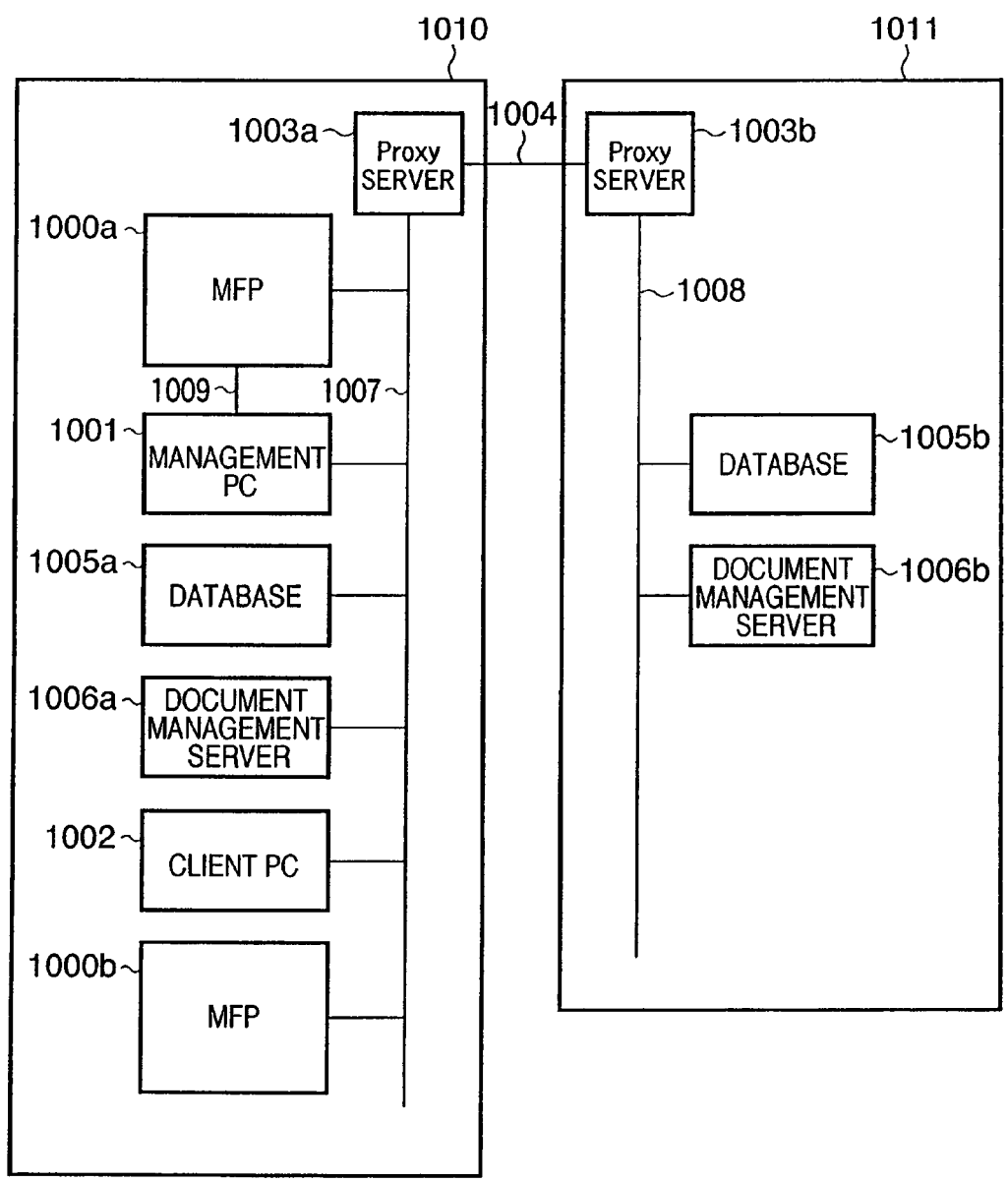
FIG. 1 is a block diagram showing the schematic arrangement of a system according to an embodiment of the present invention.

FIG. 1 is a block diagram showing the schematic arrangement of a system according to the present embodiment. Referring to FIG. 1, the system has an office 1010 and another office 1011. The offices 1010 and 1011 may exist in, for example, office buildings located at a distance or on different floors of an office building.

The office 1010 has a proxy server 1003*a*, MFP (Multi Function Peripheral) 1000*a*, management PC 1001, database 1005*a*, document management server 1006*a*, client PC 1002, and MFP 1000*b*. These devices in the office 1010 connect to a network 1007 such as a LAN so that they can execute data communication with each other. The management PC 1001 connects to the MFP 1000*a* via a signal line 1009. The management PC 1001 controls the operation of the MFP 1000*a* via the signal line 1009. The MFP 1000*a* may incorporate the management PC 1001.

The office 1011 has a proxy server 1003*b*, database 1005*b*, and document management server 1006*b*. These devices connect to a network 1008 such as a LAN so that they can execute data communication with each other. The proxy server 1003*a* in the office 1010 and the proxy server 1003*b* in the office 1011 connect to a network 1004 such as the Internet. This allows the devices in the office 1010 and the devices in the office 1011 to communicate data with each other via the proxy servers 1003*a* and 1003*b* and the network 1004.

Although not illustrated in FIG. 1, the MFPs 1000*a* and 1000*b* may connect to a public line. In this case, the MFPs 1000*a* and 1000*b* can transmit/receive FAX or various kinds of information via the public line.

Figure 10:
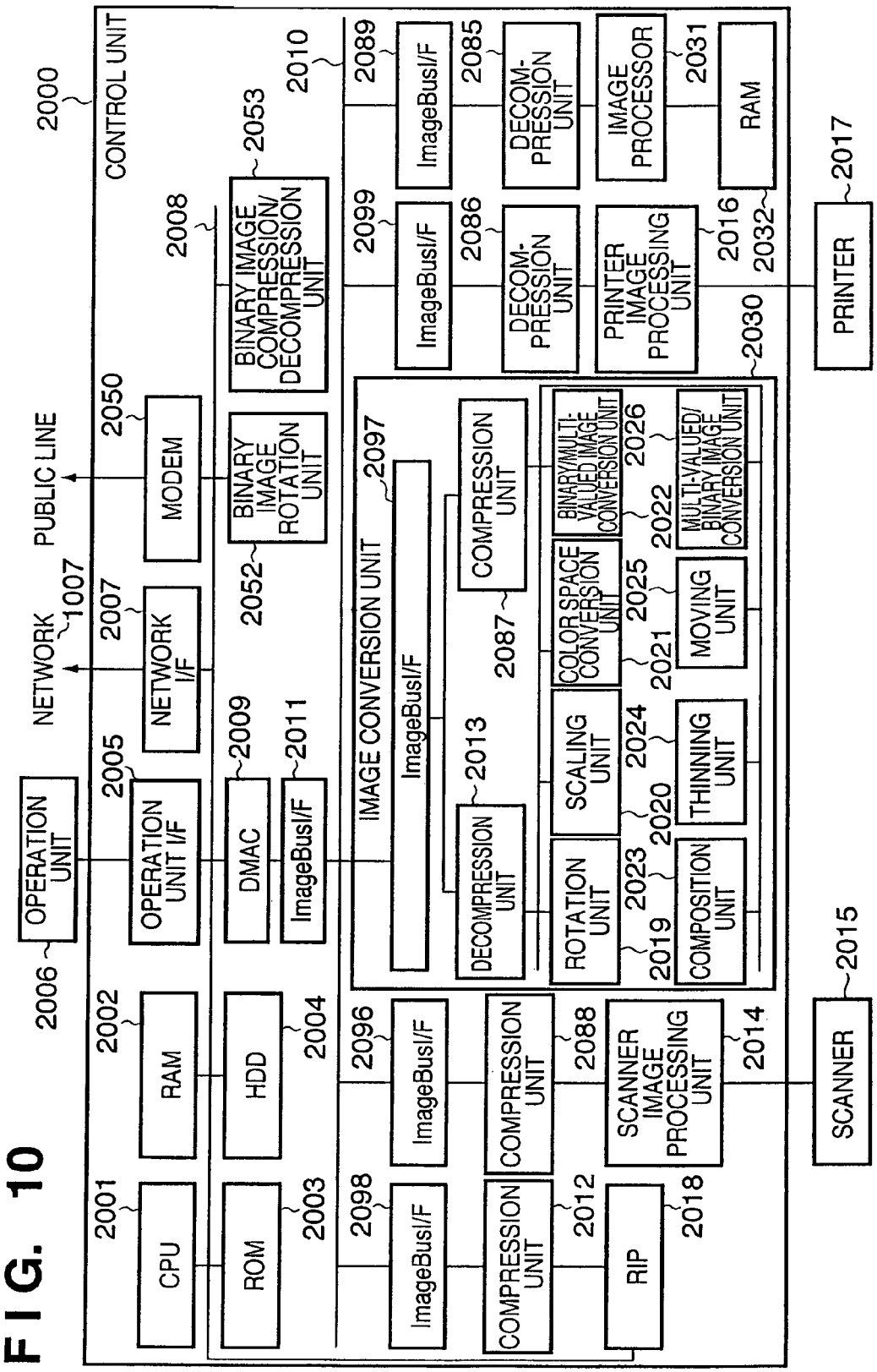
FIG. 10 is a block diagram showing the main hardware configuration of the MFPs 1000*a* and 1000*b*.

FIG. 10 is a block diagram showing the main hardware configuration of the MFPs 1000*a* and 1000*b*. Each of the MFPs 1000*a* and 1000*b* includes an operation unit 2006, scanner 2015, printer 2017, and control unit 2000.

The operation unit 2006 inputs various instructions to the apparatus upon being operated by the operator of the apparatus and also displays various kinds of information. The scanner 2015 reads, as an image, information printed on a printing medium such as a paper sheet. The printer 2017 prints an image or text on a printing medium such as a paper sheet. The control unit 2000 controls the operations of the units.

A CPU 2001 controls the operations of the units included in the apparatus and executes the processes (to be described later) of the apparatus by using programs and data stored in a RAM 2002 and a ROM 2003.

The RAM 2002 has an area to temporarily store programs and data loaded from an HDD (Hard Disk Drive) 2004 or programs and data received from an external device via a network I/F 2007 or a modem 2050. The RAM 2002 also has a work area for the CPU 2001 to execute various kinds of processes. That is, the RAM 2002 can provide various kinds of areas as needed.

The ROM 2003 stores the setting data and boot programs of the apparatus. The ROM 2003 also stores programs and data about various kinds of GUIs (Graphical User Interfaces) to be described later.

The HDD 2004 can save image data received from an external device via the network I/F 2007 or modem 2050 and image data read by the scanner 2015. In the following explanation, information storage and registration in the apparatus indicate storage and registration in the HDD 2004. The HDD 2004 may store some of pieces of information described above as those stored in the ROM 2003.

An operation unit I/F 2005 functions as an I/F for data communication between the control unit 2000 and the operation unit 2006. Various instructions input to the operation unit 2006 are sent to the CPU 2001 via the operation unit 2006 as instruction signals. Display information to be displayed on the display screen of the operation unit 2006 is sent from the control unit 2000 to the operation unit 2006 via the operation unit I/F 2005.

The network I/F 2007 connects the apparatus to the network 1007 in the office 1010. The apparatus can execute data communication with any device connected to the network 1007 (i.e., any device provided in the office 1010) via the network I/F 2007. The apparatus can also execute data communication with any device in the office 1011 via the proxy server 1003a connected to the network 1007.

The modem 2050 connects the apparatus to a public line. The apparatus can transmit/receive FAX or image data via the modem 2050.

A binary image rotation unit 2052 changes the direction of an image to be transmitted to the outside via the modem 2050. A binary image compression/decompression unit 2053 compresses/decompresses an image. This compression/decompression supports JBIG, MMR, MR, and MH.

A DMAC 2009 indicates a DMA controller which sends image data stored in the RAM 2002 to an image bus I/F 2011 without intervening the CPU 2001. It is also possible to store image data sent from the image bus I/F 2011 in the RAM 2002 without intervening the CPU 2001.

The above-described units connect to a bus 2008.

The image bus I/F 2011 controls high-speed image input/output via an image bus 2010. This also applies to image bus I/Fs 2098, 2099, 2096, 2097, and 2089.

A compression unit 2012 compresses (e.g., JPEG-compresses) received image data in every predetermined unit, for example, 32 pixels×32 pixels and transfers the compressed data to the image bus I/F 2098. This also applies to compression units 2088 and 2087.

A decompression unit 2013 decompresses compressed image data received via the image bus I/F 2097. This also applies to decompression units 2085 and 2086.

A scanner image processing unit 2014 executes appropriate image processing (e.g., correction, manipulation, and editing) for image data (e.g., color image or monochrome image) received from the scanner 2015. The processed image is sent to the compression unit 2088 of the succeeding stage.

A printer image processing unit 2016 executes appropriate image processing (e.g., correction, manipulation, and editing) for print data to be sent to the printer 2017. When the printer 2017 executes printing, the decompression unit 2086 executes binary/multi-valued data conversion. Hence, the printer image processing unit 2016 can output binary data or multi-valued data.

An image conversion unit 2030 executes various kinds of conversion processes for image data held in the RAM 2002 and returns the processed image data to the RAM 2002 again.

A rotation unit 2019 rotates an image of a predetermined size (e.g., 32 pixels×32 pixels) by a designated angle.

A scaling unit 2020 converts the resolution of an image (e.g., from 600 dpi to 200 dpi) or scales an image (e.g., from 25% to 400%). Before scaling, the scaling unit 2020 rearranges an image with 32 pixels×32 pixels to an image with 32 lines.

A color space conversion unit 2021 converts, for example, a YUV image into an Lab image by executing a matrix operation and an operation using a LUT for a received multi-valued image. This color space conversion is done by using a 3×8 matrix operation or a one-dimensional LUT so that known undercolor removal and show-through prevention can be done. The converted image is output as a multi-valued image.

A binary/multi-valued image conversion unit 2022 converts a binary image with pixels each containing 1 bit into a multi-valued image with pixels each containing 8 bits. Conversely, a multi-valued/binary image conversion unit 2026 converts a multi-valued image with pixels each containing 8 bits into a binary image with pixels each containing 1 bit by using error diffusion.

A composition unit 2023 composites two multi-valued images to generate one multi-valued composite image. For example, when a company logotype image is composited with a document image, the company logotype can easily be added to the document image.

A thinning unit 2024 converts the resolution by thinning pixels of a multi-valued image. With this resolution conversion, an image having a size of ½, ¼, or ⅛ the original image size is generated. A combination of the thinning unit 2024 and scaling unit 2020 allows broader enlargement and reduction.

A moving unit 2025 adds/removes a margin to/from a binary image or multi-valued image.

The above-described rotation unit 2019, scaling unit 2020, color space conversion unit 2021, binary/multi-valued image conversion unit 2022, composition unit 2023, thinning unit 2024, moving unit 2025, and multi-valued/binary image conversion unit 2026 can operate in a cooperative manner. For example, rotation and resolution conversion of a multi-valued image in the RAM 2002 can be done without intervening the RAM 2002.

Figure 11:
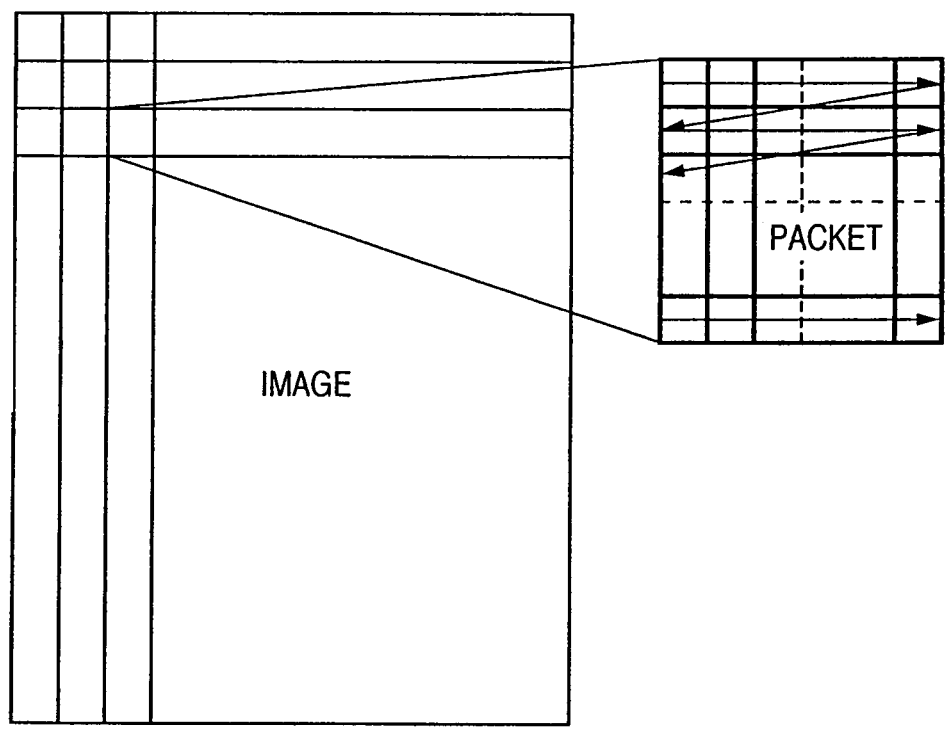
FIG. 11 is a view showing the format of an image used in the MFPs 1000*a* and 1000*b*.

FIG. 11 is a view showing the format of an image used in the MFPs 1000a and 1000b. An image used in the MFPs 1000a and 1000b employs an image packet structure disclosed in Japanese Patent Laid-Open No. 2001-103473.

More specifically, a compression unit (2012, 2088, or 2087) rearranges an image with a raster format into packets each including 32 pixels×32 pixels, as shown in FIG. 11, and JPEG-compresses each packet. Pieces of information such as an ID, color space, Q table ID, and data length representing the position of a packet in the image are added to the packet as a header. The header contains input source identification information. More specifically, the header contains an input source device identifier indicating whether the input source of the image is the scanner 2015 or the image itself is PDL, and an image quality identifier indicating whether the image is high-quality data or low-quality data. Binary data (image attribute flag) representing a text or a photo is also compressed and added to the JPEG-compressed packet.

Figure 12:
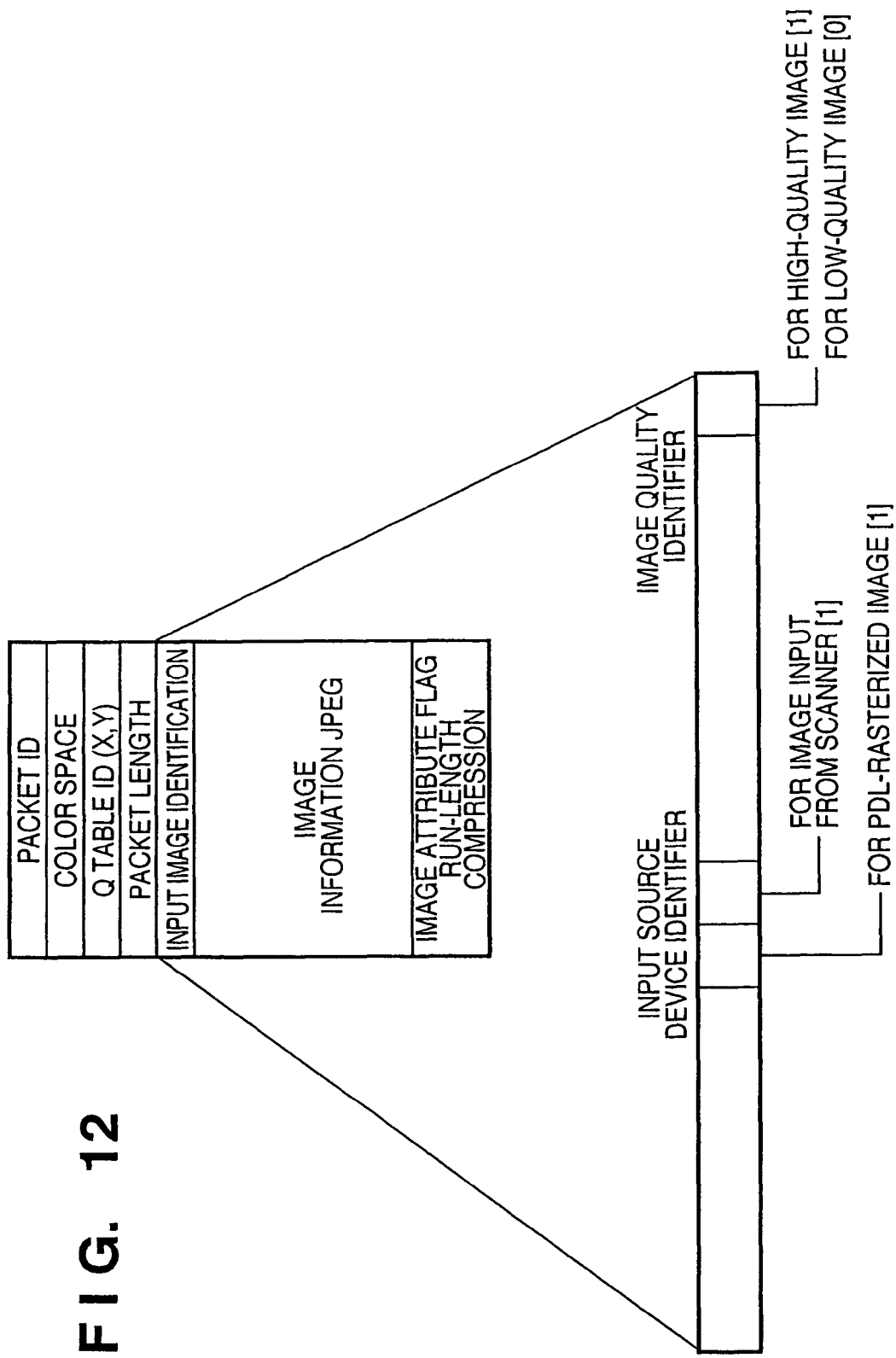
FIG. 12 is a view showing a structural example of a packet with additional information (to be generally referred to as packet data)

FIG. 12 is a view showing a structural example of a packet with additional information (to be generally referred to as packet data). A decompression unit (2013, 2086, or 2085) decompresses a compression-coded image (image information JPEG) with 32 pixels×32 pixels and rearranges the decompressed data to a raster image while referring to the header. In such a packet image, image rotation can be done by rotating only the image in a packet. When the position of the packet ID is changed, the image can be rotated while partially decompressing/compressing the image data. This largely increases the efficiency. All images on the image bus 2010 are transmitted as packet images.

For FAX transmission or a situation where the binary image rotation unit 2052 or binary image compression/decompression unit 2053 requires a raster image, a packet image is converted into a raster image.

Referring back to FIG. 10, an image processor 2031 reads out image data from the RAM 2002 and writes it in a RAM 2032 directly. If image data stored in the RAM 2002 is compressed, the image data is decompressed by the decompression unit 2085 and written in the RAM 2032.

After that, the image processor 2031 generates image feature amount data representing an image feature amount of the image data written in the RAM 2032. In this embodiment, the feature amount of an image is obtained based on information obtained by executing a block selection process of segmenting the image data into regions (blocks) such as text, line image, and image regions in accordance with its attribute. In this embodiment, structured data representing the structure of the image is generated based on the block segmentation result as the feature amount of the image. This structured data will be called a document analysis output format (DAOF).

Figure 9:
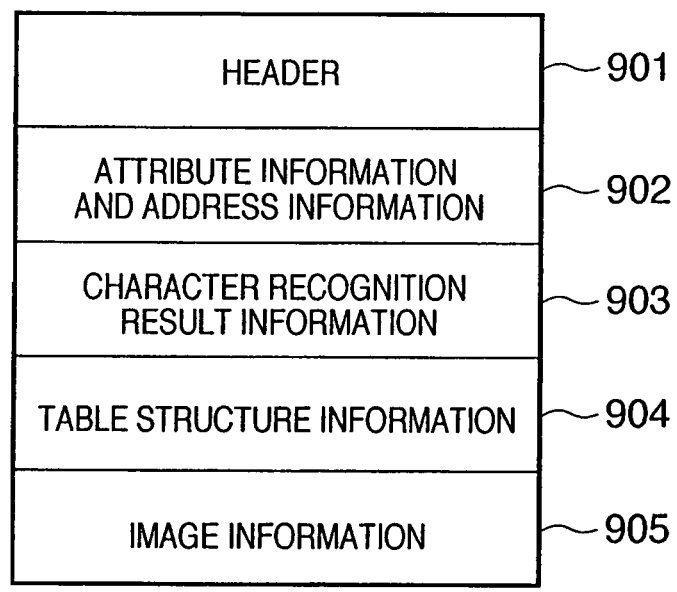
FIG. 9 is a view showing the data structure of image feature amount data complying with the DAOF.

FIG. 9 is a view showing the data structure of image feature amount data complying with the DAOF. Referring to FIG. 9, a header 901 includes various kinds of information about image feature amount data.

A field 902 contains the attribute information (e.g., text, title, caption, line image, natural image, frame, or table) of each of rectangles included in the image used to generate the image feature amount data, and the address information of the rectangles.

A field 903 contains a character string of a recognition result (character recognition result information) obtained by executing character recognition for a rectangle determined to have an attribute such as text, title, or caption.

A field 904 contains details (table structure information) of a rectangle determined to have a table attribute.

A field 905 contains the data of a rectangle determined to have an attribute of a natural image or line image, that is, the image data of the rectangle itself.

In this way, the image processor 2031 generates one image feature amount data in correspondence with one image data. Details of image feature amount data complying with the DAOF are disclosed in Japanese Patent Laid-Open No. 2004-348706.

The image processor 2031 transfers the generated image feature amount data to the RAM 2002 via the image bus I/F 2089 and image bus 2010.

Figure 17:
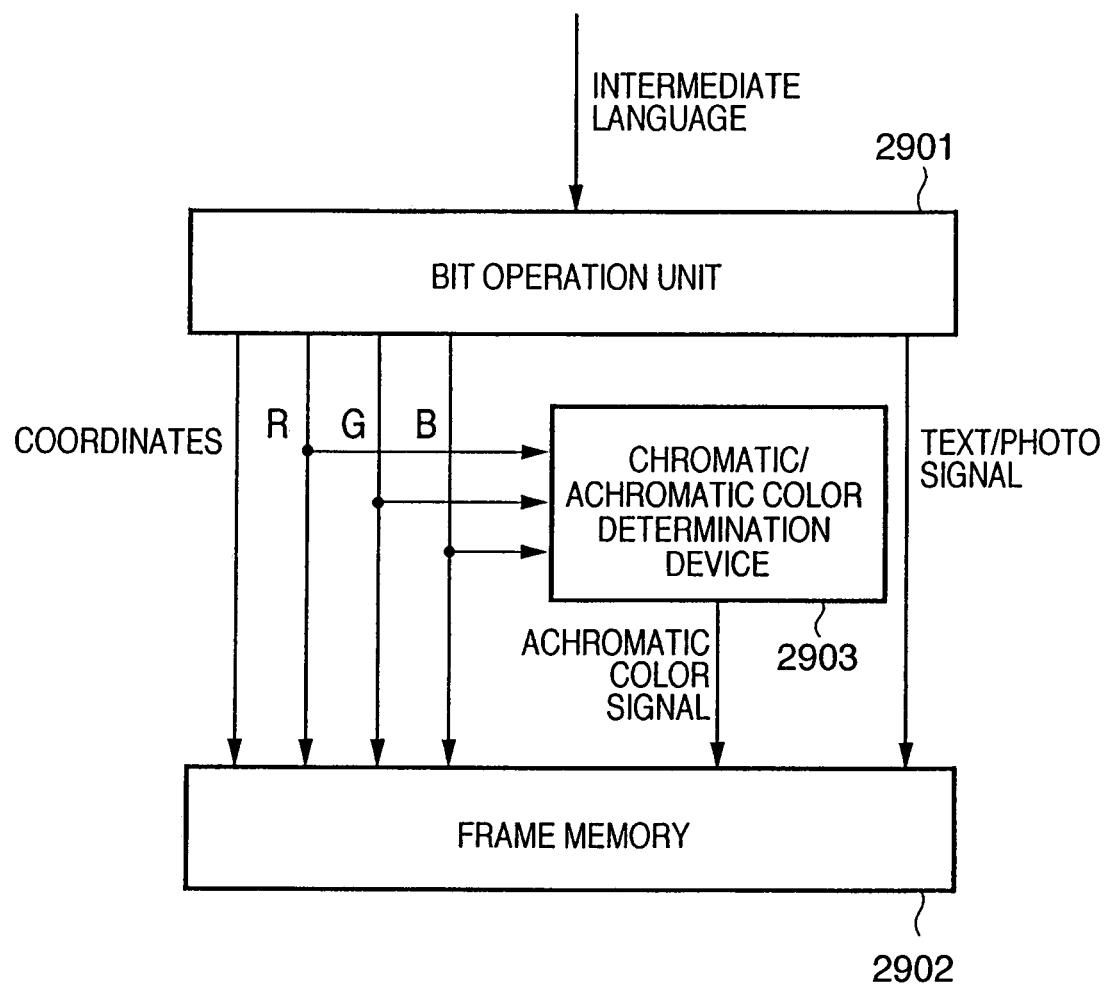
FIG. 17 is a block diagram showing the functional arrangement of an RIP 2018.

A RIP (Raster Image Processor) 2018 executes a process for intermediate data converted by the CPU 2001 based on PDL data received from an external device via the network I/F 2007. More specifically, the CPU 2001 converts received PDL data into intermediate data and transfers the converted intermediate data to the RIP 2018 via the system bus 2008. FIG. 17 is a block diagram showing the functional arrangement of the RIP 2018.

The RIP 2018 inputs each object contained in intermediate data to a bit operation unit 2901. The bit operation unit 2901 renders each object to R, G, and B image signal values and a text/photo flag. The text/photo flag is generated in accordance with an object containing in the intermediate data. For example, a text object or a line (vector) object is determined as a text. A bitmap or JPEG image object is determined as a photo. The R, G, and B image signal values generated by the bit operation unit 2901 are input to a chromatic/achromatic color determination device 2903. The chromatic/achromatic color determination device 2903 generates a chromatic/achromatic color signal.

The R, G, and B image signal values, chromatic/achromatic color flag, and text/photo flag are written at corresponding addresses in a frame memory 2902 in accordance with the coordinates of the object. If objects overlap, the lower object is rendered and written in the frame memory 2902 first. The upper object is rendered and overwritten in the frame memory 2902 later. With this process, pixel data to be finally printed is stored in the frame memory 2902. The pixel data stored in the frame memory 2902 is sent to the compression unit 2012 after all objects are rendered. The compression unit 2012 rearranges and compresses the signal of each pixel to the above-described image format and stores it in the RAM 2002 via the image bus I/F 2098.

Figure 13:
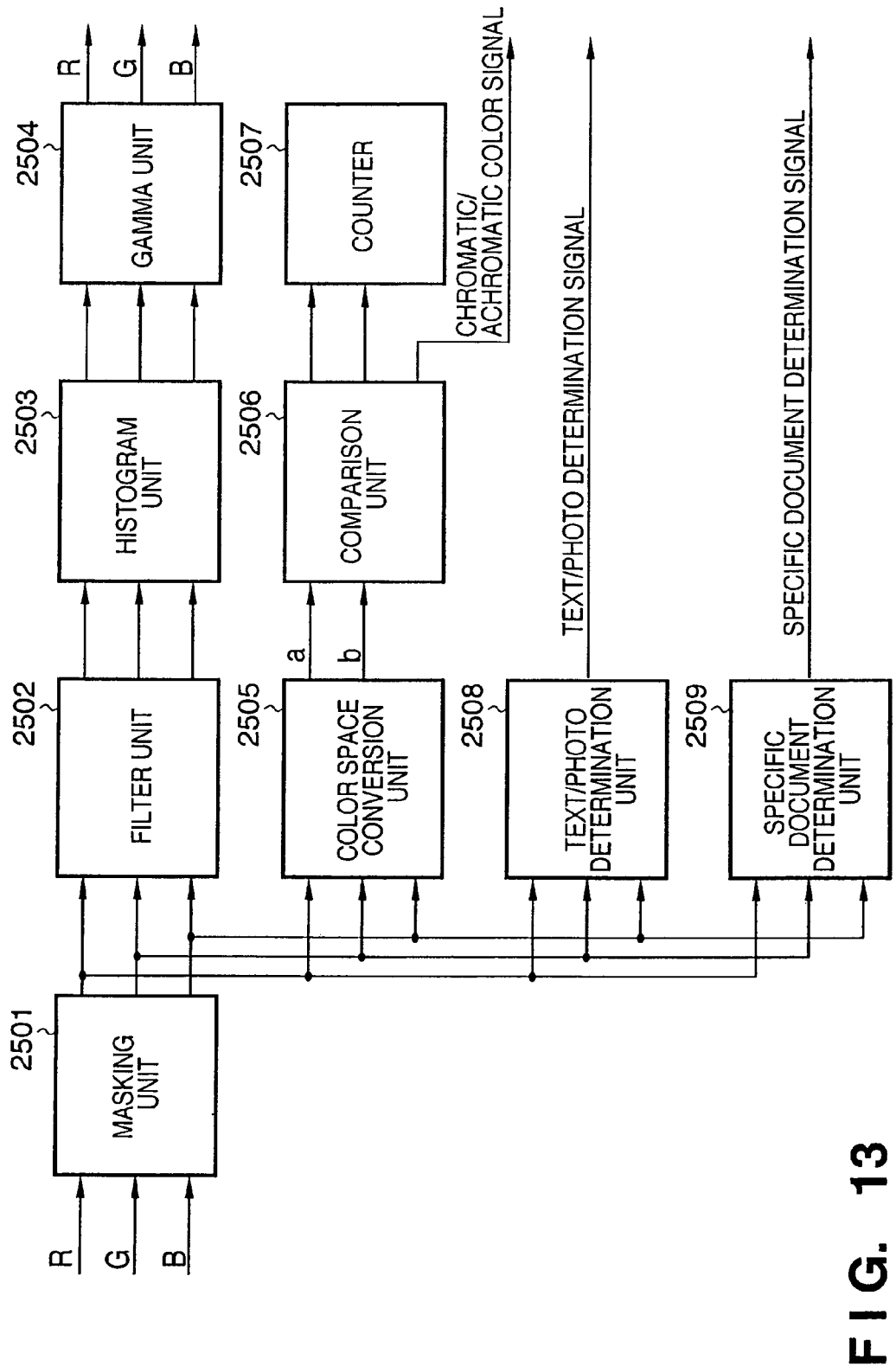
FIG. 13 is a block diagram showing the functional arrangement of a scanner image processing unit 2014.

FIG. 13 is a block diagram showing the functional arrangement of the scanner image processing unit 2014. A masking unit 2501 converts R, G, and B luminance signals each having 8 bits and input from the scanner 2015 into standard R, G, and B color signals independent of the filter color of the image sensing element. A filter unit 2502 shades the image or increases its contrast by using, for example, an 9×9 matrix.

A histogram unit 2503 samples each image signal in the input image to create a histogram to be used for undercolor level determination of the input image. The histogram unit 2503 creates a histogram by sampling, at a predetermined pitch in both the main scanning direction and the sub-scanning direction, R, G, and B data in a rectangular region surrounded by a starting point to a terminal point which are designated in the main scanning direction and sub-scanning direction. The histogram is read out when an undercolor removal instruction or show-through prevention instruction is input. The undercolor of the document is estimated from the histogram. It is saved and managed in the HDD 2004 as an undercolor removal level together with the image and used for an image process upon printing or transmission.

A gamma unit 2504 increases or decreases the density of the entire image. For example, the gamma unit 2504 converts the color space of the input image into an arbitrary color space or executes a correction process of the tint of the input system. To determine whether the image read by the scanner 2015 is color or monochrome, a color space conversion unit 2505 converts the image before scaling into Lab signals. Of the signals, a and b indicate color signal components. A comparison unit 2506 determines as chromatic if the color signal components have a predetermined level or more, or otherwise, determines as achromatic, and outputs a 1-bit determination signal.

A counter 2507 counts the determination signal from the comparison unit 2506.

A text/photo determination unit 2508 extracts a text edge from an image, separates the image into a text and a photo, and outputs a text/photo determination signal.

A specific document determination unit 2509 compares the received image signal with a pattern held in itself and outputs a determination result (specific document determination signal) representing match or mismatch. The image is manipulated in accordance with the determination result, thereby preventing forgery of banknotes and securities.

The R, G, and B image signals output from the gamma unit 2504, the chromatic/achromatic color signal output from the comparison unit 2506, and the text/photo determination signal output from the text/photo determination unit 2508 are sent to the compression unit 2088. The compression unit 2088 rearranges and compresses the signal of each pixel to the above-described image format and stores it in the RAM 2002 via the image bus I/F 2096.

Figure 18:
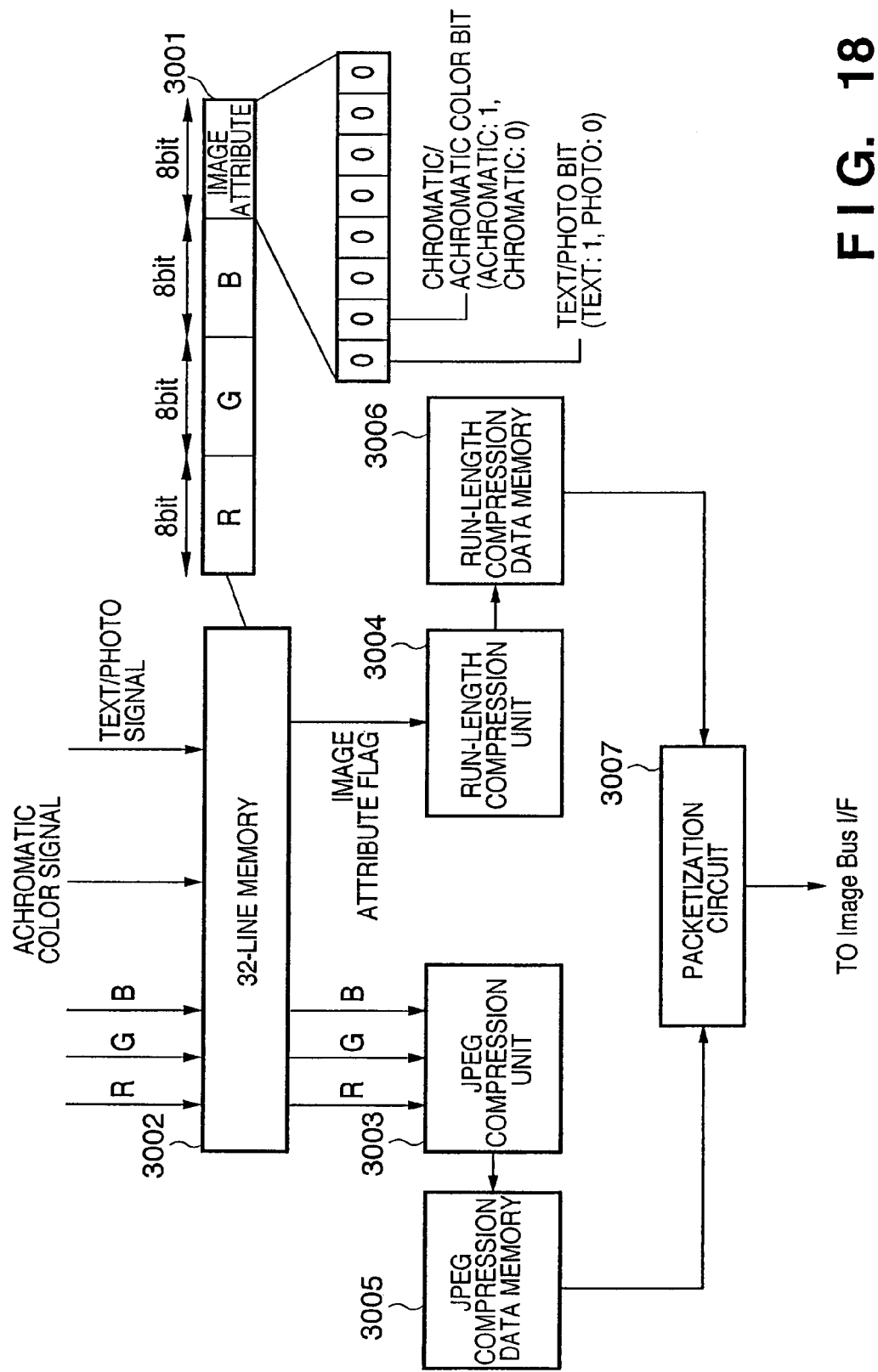
FIG. 18 is a block diagram showing the functional arrangement of a compression unit 2088.

FIG. 18 is a block diagram showing the functional arrangement of the compression unit 2088.

The R, G, and B image signals, text/photo determination signal, and chromatic/achromatic color signal sent from the scanner image processing unit 2014 and RIP 2018 to the compression unit 2012 are stored in a line memory 3002 with 32 lines to segment the image into rectangles each having 32 pixels×32 pixels.

The 32-line memory 3002 stores data having a format 3001 in which the R, G, and B image signals and image attribute flag each containing 8 bits are arranged in correspondence with each pixel. The image attribute flag also has 8 bits. The most significant bit indicates the text/photo flag, and the next bit indicates the chromatic/achromatic color flag. When image data of 32 lines is stored in the 32-line memory 3002, the R, G, and B data segmented into rectangles each containing 32 pixels×32 pixels are sent to a JPEG compression unit 3003.

The JPEG compression unit 3003 stores the JPEG compression result in a JPEG compression data memory 3005. Simultaneously, the image attribute data segmented into rectangles each containing 32 pixels×32 pixels is sent to a run-length compression unit 3004 and subjected to run-length compression. The run-length compression result is stored in a run-length compression data memory 3006.

When JPEG compression and run-length compression are completed, a packetization circuit 3007 reads out the data from the JPEG compression data memory 3005 and run-length compression data memory 3006. The packetization circuit 3007 generates a packet in accordance with the packet format shown in FIG. 12 and sends the packet to the image bus I/F 2096.

Figure 14:
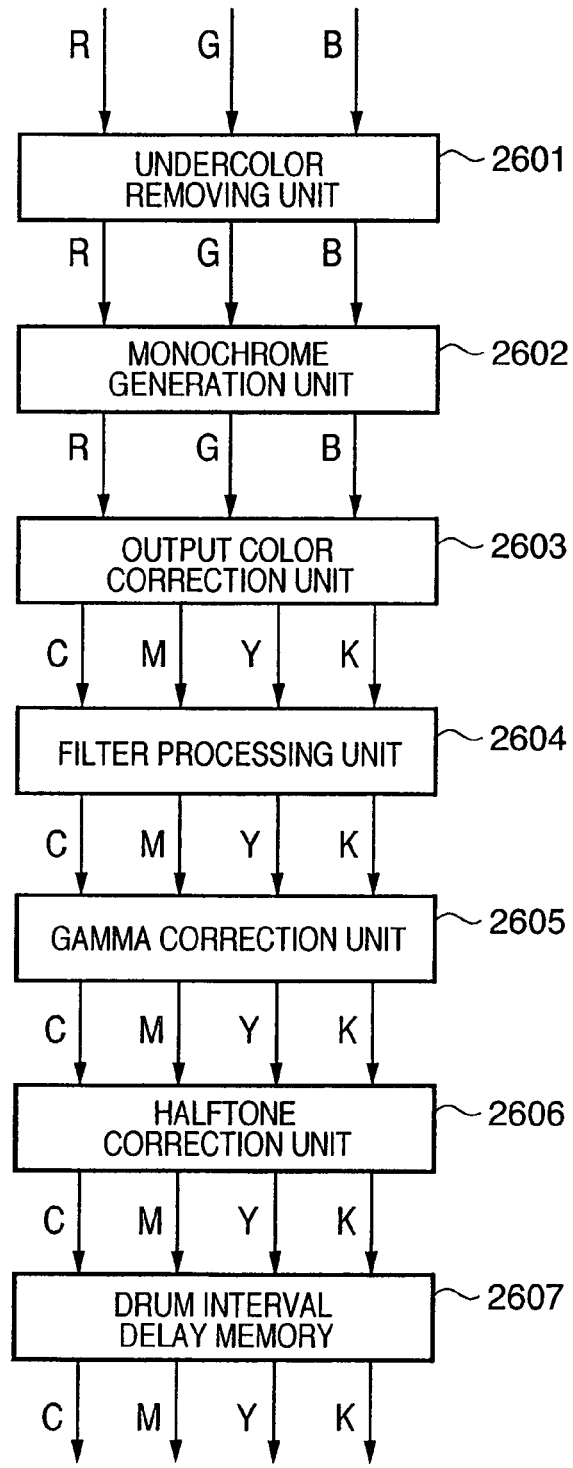
FIG. 14 is a block diagram showing the functional arrangement of a printer image processing unit 2016.

FIG. 14 is a block diagram showing the functional arrangement of the printer image processing unit 2016.

An undercolor removing unit 2601 removes the undercolor of image data, thereby eliminating unnecessary undercolor fog. The undercolor removal is done by using, for example, a 3×8 matrix operation or a one-dimensional LUT.

To convert color image data into monochrome data and print it as a monochrome image, a monochrome generation unit 2602 converts color image data such as R, G, and B data into monochrome gray data. The monochrome generation unit 2602 executes, for example, a 1×3 matrix operation of multiplying R, G, and B data by an arbitrary constant to generate a gray signal.

An output color correction unit 2603 executes color correction in accordance with the characteristic of the printer 2017. The output color correction unit 2603 executes, e.g., a 4×8 matrix operation or direct mapping to generate C, M, Y, K, Lc, and Lm signals of six colors or C, M, Y, and K signals of four colors from the received R, G, and B image signals. In this embodiment, each of image signals corresponding to six toner colors of the printer 2017, i.e., cyan (C), magenta (M), yellow (Y), black (K), light cyan (Lc), and light magenta (Lm) is output as an 8-bit signal at 600 dpi (dots per inch).

Alternatively, each of image signals corresponding to four colors, i.e., cyan (C), magenta (M), yellow (Y), and black (K) is output as an 8-bit signal at 600 dpi (dots per inch). Switching between the six-color image signal output and the four-color image signal output is done by a process to be described later in detail.

A filter processing unit 2604 arbitrarily corrects the spatial frequency of image data. The filter processing unit 2604 executes, e.g., a 9×9 matrix operation.

A gamma correction unit 2605 executes gamma correction in accordance with the characteristic of the printer 2017. The gamma correction unit 2605 normally includes a one-dimensional LUT.

A halftone correction unit 2606 executes an arbitrary halftone process in accordance with the number of tones of the printer 2017. The halftone correction unit 2606 executes an arbitrary screen process or error diffusion such as binarization or a 32-ary process. The processes also can be switched by the text/photo determination signal.

A drum interval delay memory 2607 shifts, by a drum interval, the print timings of C, M, Y, K, Lc, and Lm images in a color printer with drums corresponding to C, M, Y, K, Lc, and Lm, thereby superimposing C, M, Y, K, Lc, and Lm images. The print timings can be delayed to align the positions of the six color images in the color printer having six drums corresponding to C, M, Y, K, Lc, and Lm. Even when the output color correction unit 2603 outputs four color images corresponding to C, M, Y, and K, the drum interval delay memory 2607 can adjust the delay.

Figure 15:
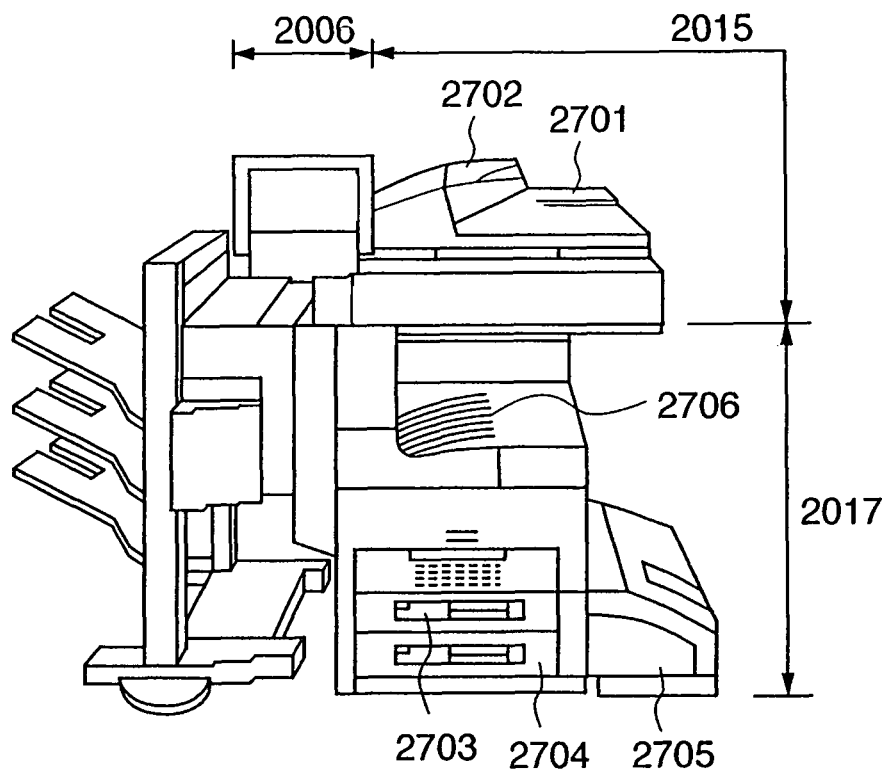
FIG. 15 is a view showing an example of the outer appearance of the MFPs 1000*a* and 1000*b*.

FIG. 15 is a view showing an example of the outer appearance of the MFPs 1000a and 1000b. The scanner 2015 serving as an image input device has an image sensing element. There are various kinds of image sensing elements. Representative examples are a CCD (Charge Coupled Device) and a CIS (Contact Image Sensor) both of which receive light, convert it into an electrical signal, and output as image data. Generally, the CCD is more expensive and can output image data with a higher quality than the CIS. For this reason, an expensive scanner that must ensure a high image quality often incorporates a CCD while an inexpensive scanner that is required to have high cost performance often incorporates a CIS.

This embodiment assumes that a plurality of scanner units included in the system have different image sensing elements. More specifically, the scanner of the MFP 1000a uses a CCD, and the scanner of the MFP 1000b uses a CIS.

The scanner 2015 illuminates an image on a document paper sheet and scans the image sensing element (not shown), thereby converting the image into a raster image electrical signal. Document paper sheets are set on a tray 2702 of a document feeder 2701. When the user inputs a reading start instruction from the operation unit 2006, the CPU 2001 sends an instruction to the scanner 2015. The document image reading operation is performed by feeding the document paper sheets from the tray 2702 one by one.

The printer 2017 serving as an image output device is a portion that converts raster image data into an image on a paper sheet. In this embodiment, the printer 2017 is a color LBP that employs an electrophotographic method using a photosensitive drum and toners. Except the electrophotographic method, an inkjet method of directly printing an image on a paper sheet by causing a micro nozzle array to discharge ink is also available. Either method is usable. The print resolution is 600 dpi (dots per inch). The printer 2017 employs a six-drum tandem system including photosensitive drums corresponding to the respective colors so that a variety of color printing can be done by using basic colors of C, M, Y, K, Lc, and Lm and a combination thereof, as described above.

Dark and light color developing agents are prepared by changing the amounts of pigments having the same spectral characteristic. A light magenta toner contains a pigment with a spectral characteristic equal to that of magenta in a smaller content. A light cyan toner contains a pigment with a spectral characteristic equal to that of cyan in a smaller content. When dark and light color toners are prepared for magenta and cyan, granularity in an image with a light color like a human flesh color can be reduced, and the reproducibility can be improved. The print operation starts in accordance with an instruction from the CPU 2001.

The main body includes a plurality of paper feed stages to change the paper size or paper orientation. Paper cassettes 2703, 2704, and 2705 are provided in correspondence with them. A discharge tray 2706 receives printed paper sheets.

Figure 16:
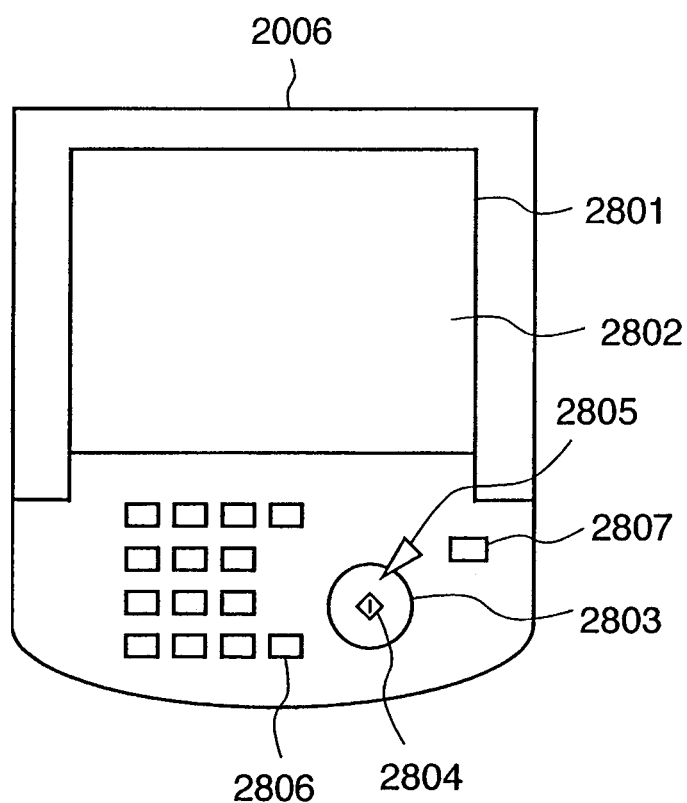
FIG. 16 is a view showing an arrangement example of the operation unit 2006.

FIG. 16 is a view showing an arrangement example of the operation unit 2006. An LCD display unit 2801 has a touch panel sheet 2802 adhered to the surface of the LCD. When the operator of the apparatus designates an arbitrary position on the screen, the LCD display unit 2801 notifies the CPU 2001 of the designated coordinate position. The display screen of the LCD display unit 2801 can display various kinds of information. For example, the display screen of the LCD display unit 2801 displays button images. When the operator of the apparatus designates, with his/her finger, the position of a button image displayed on the screen of the LCD display unit 2801, the CPU 2001 is notified of the designated position. The CPU 2001 executes a process corresponding to the button image.

The operator of the apparatus can input a document image reading operation instruction to the CPU 2001 by pressing a start key 2803. A two-color LED 2804 with green and red exists at the center of the start key 2803 to indicate, by its color, whether the start key 2803 is usable.

The operator of the apparatus can input an instruction to stop a current operation to the CPU 2001 by pressing a stop key 2805.

An ID key 2806 is used by the operator of the apparatus to input his/her ID. The operator of the apparatus initializes various settings input via the operation unit 2006 by pressing a reset key 2807.

Figure 19:
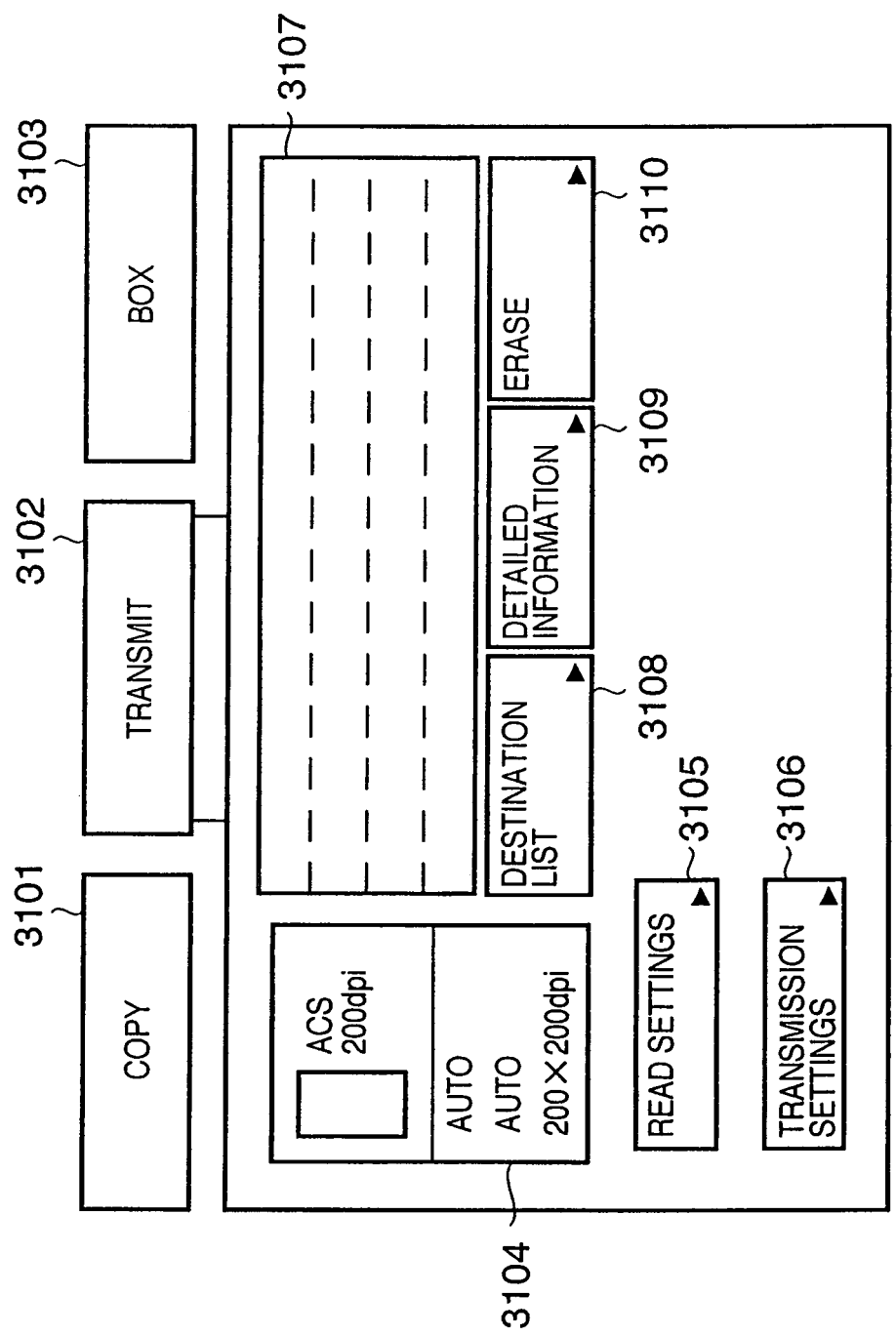
FIG. 19 is a view showing a display example of an initial window displayed on the display screen of the LCD display unit 2801.

FIG. 19 is a view showing a display example of an initial window displayed on the display screen of the LCD display unit 2801. This window is displayed again after setting processes in various setting windows to be described later.

The user designates a tab 3101 to display a window for copy settings. The user designates a tab 3102 to transmit an image scanned by the apparatus to the outside by FAX or e-mail.

The user designates a tab 3103 to display a window for settings to register a scanned image or a PDL image in the HDD 2004 or print, transmit, or edit a scanned image or a PDL image stored in the HDD 2004.

A region 3104 displays image reading settings which are set in a window displayed by designating a button image 3105.

The user designates the button image 3105 to display a window for settings about the resolution and density in image reading.

The user designates a button image 3106 to display a window to do timer settings for timer transmission or print settings for the printer 2017.

A region 3107 displays transmission destinations selected in a window displayed by designating a button image 3108.

The user designates the button image 3108 to display a window to display a list of transmission destination candidates.

When the user selects one of transmission destinations displayed in the region 3107 and designates a button image 3109, he/she can input, to the CPU 2001, an instruction to display detailed information about the selected transmission destination.

The user designates a button image 3110 to erase a transmission destination selected in the region 3107.

Figure 20:
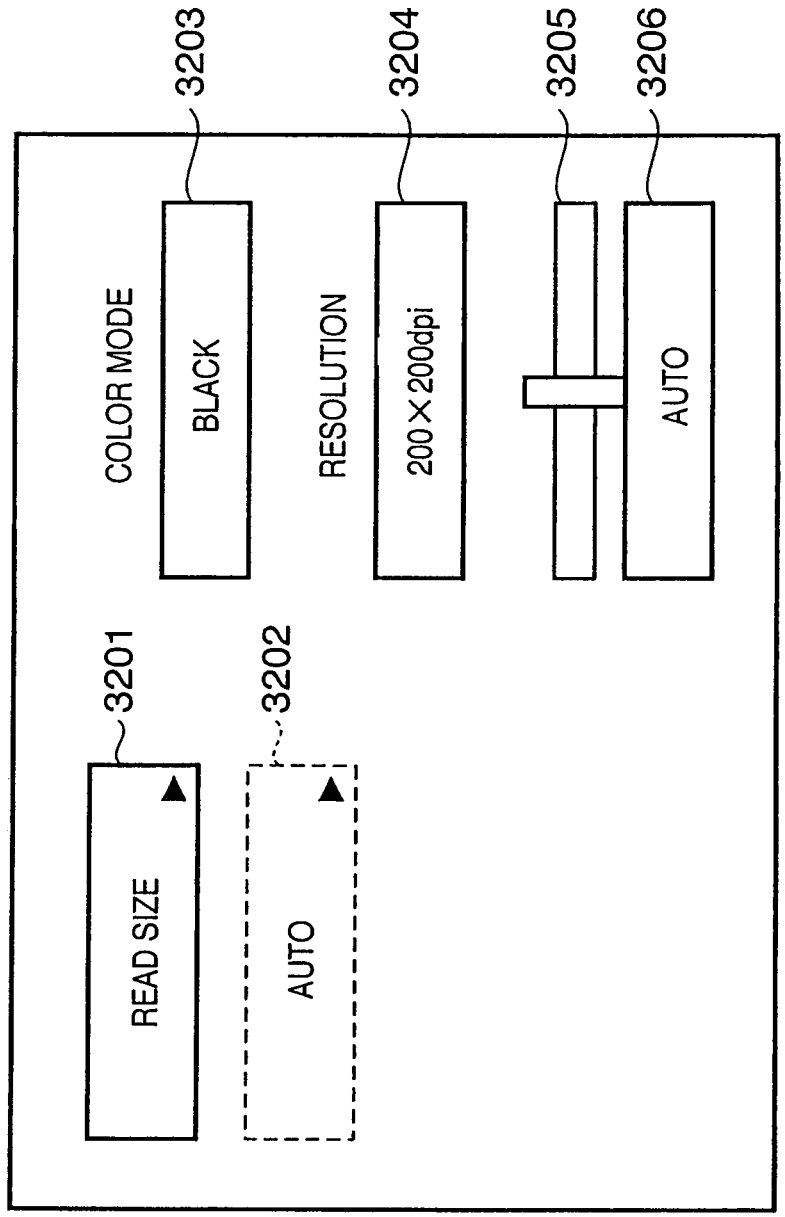
FIG. 20 is a view showing a display example of a window displayed on the display screen of the LCD display unit 2801 when a button image 3105 is designated.

FIG. 20 is a view showing a display example of a window displayed on the display screen of the LCD display unit 2801 when the button image 3105 is designated.

The user designates a button image 3201 to display a list of read document sizes. The user can select a desired read document size from the list. The selected read document size is displayed in a region 3202.

The user designates a button image 3203 to display a list of document reading modes. The list includes three modes, "color, "black", and "auto (ACS)". The modes are selectable even in copy and box. If the count result by the counter 2507 is smaller than a predetermined value, the document is determined as a monochrome document. If the count result is larger than a predetermined value, the document is determined as a color document. Determination results are accumulated so that a color image is read in the "color" mode, a monochrome image is read in the "black" mode, and a color image is read in the "ACS" mode.

The user designates a button image 3204 to display a list of read resolutions. The user can select a desired read resolution from the list.

The user can adjust the document reading density in nine steps by using a slider 3205. The user designates a button image 3206 to set whether to automatically decide the density in reading an image with undercolor fog as in newspapers. The setting by the button image 3206 can also be done even in copy.

Figure 21:
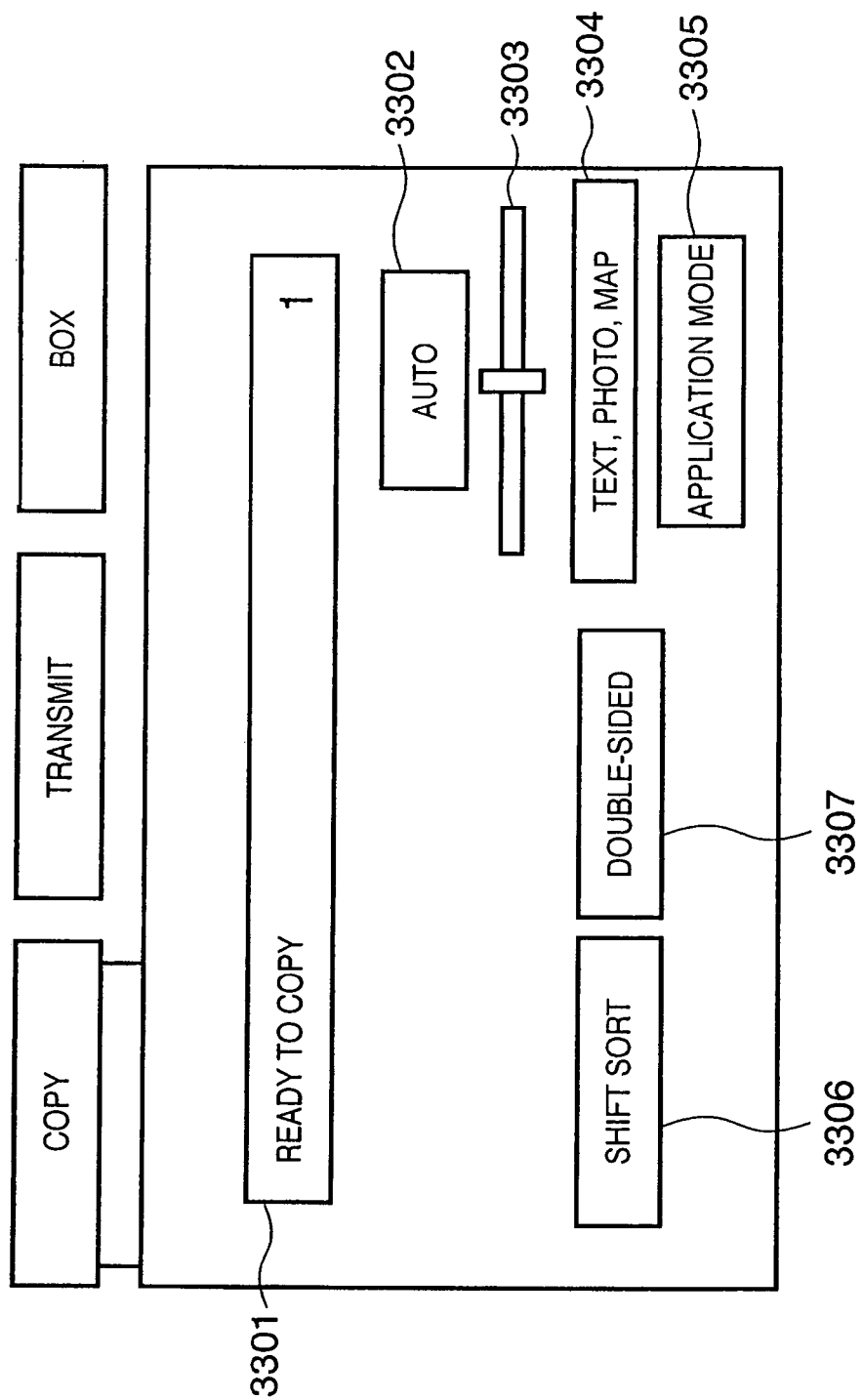
FIG. 21 is a view showing a display example of a window displayed on the display screen of the LCD display unit 2801 when a tab 3101 is designated.

FIG. 21 is a view showing a display example of a window displayed on the display screen of the LCD display unit 2801 when the tab 3101 is designated.

A region 3301 displays a message representing whether copy is enabled and also the number of copies. A button image 3302 is used for the same purpose as the button image 3206 and selects whether to automatically remove the undercolor.

A slider 3303 is used for the same purpose as the slider 3205 and allows the user to adjust the density in nine steps. The user designates a button image 3304 to display a list of document types. The list includes "text/photo/map", "text", "photo printed on photographic paper", and "printed photo". The user can select one of them.

The user designates an application mode button image 3305 to display a window to set reduction layout (a function of reducing a plurality of document images and printing them on one paper sheet) or color balance (fine adjustment of C, M, Y, and K colors).

The user designates a button image 3306 to display a window for settings about various kinds of finishing. The user can set one of "shift sort", "stapling sort", and "group sort". The user designates a button image 3307 to display a window for settings about double-sided reading and double-sided printing.

Figure 22:
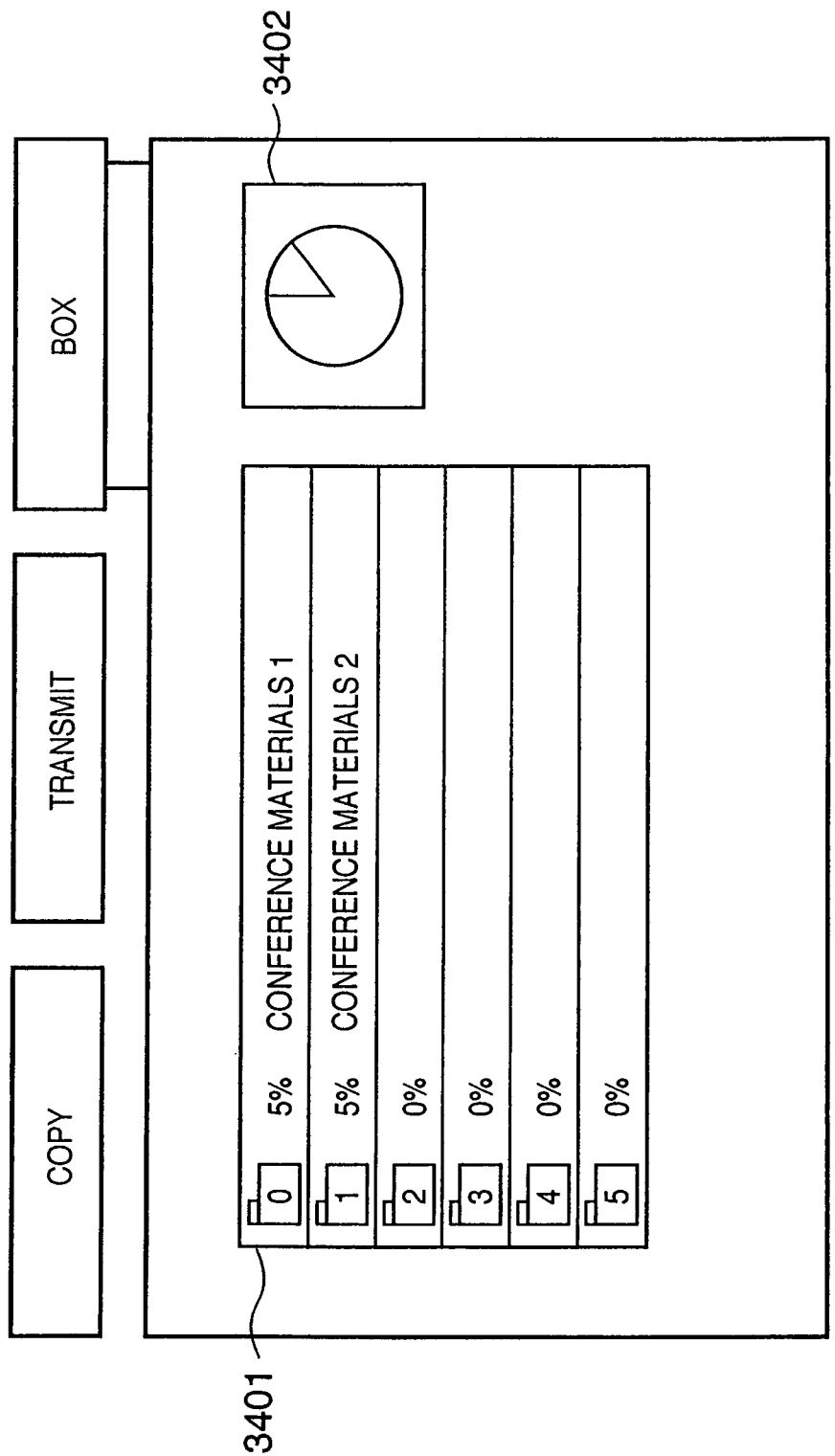
FIG. 22 is a view showing a display example of a window displayed on the display screen of the LCD display unit 2801 when a tab 3103 is designated.

FIG. 22 is a view showing a display example of a window displayed on the display screen of the LCD display unit 2801 when the tab 3103 is designated.

Folders 3401 are logically divided in the HDD 2004. Each folder is assigned a folder number in advance. Alongside the folder number of each folder, the ratio of disk capacity used by the folder is displayed. Each folder can have an arbitrary name which is also displayed here. A region 3402 displays a pie chart representing the ratio of the use amount to the entire HDD 2004.

Figure 23:
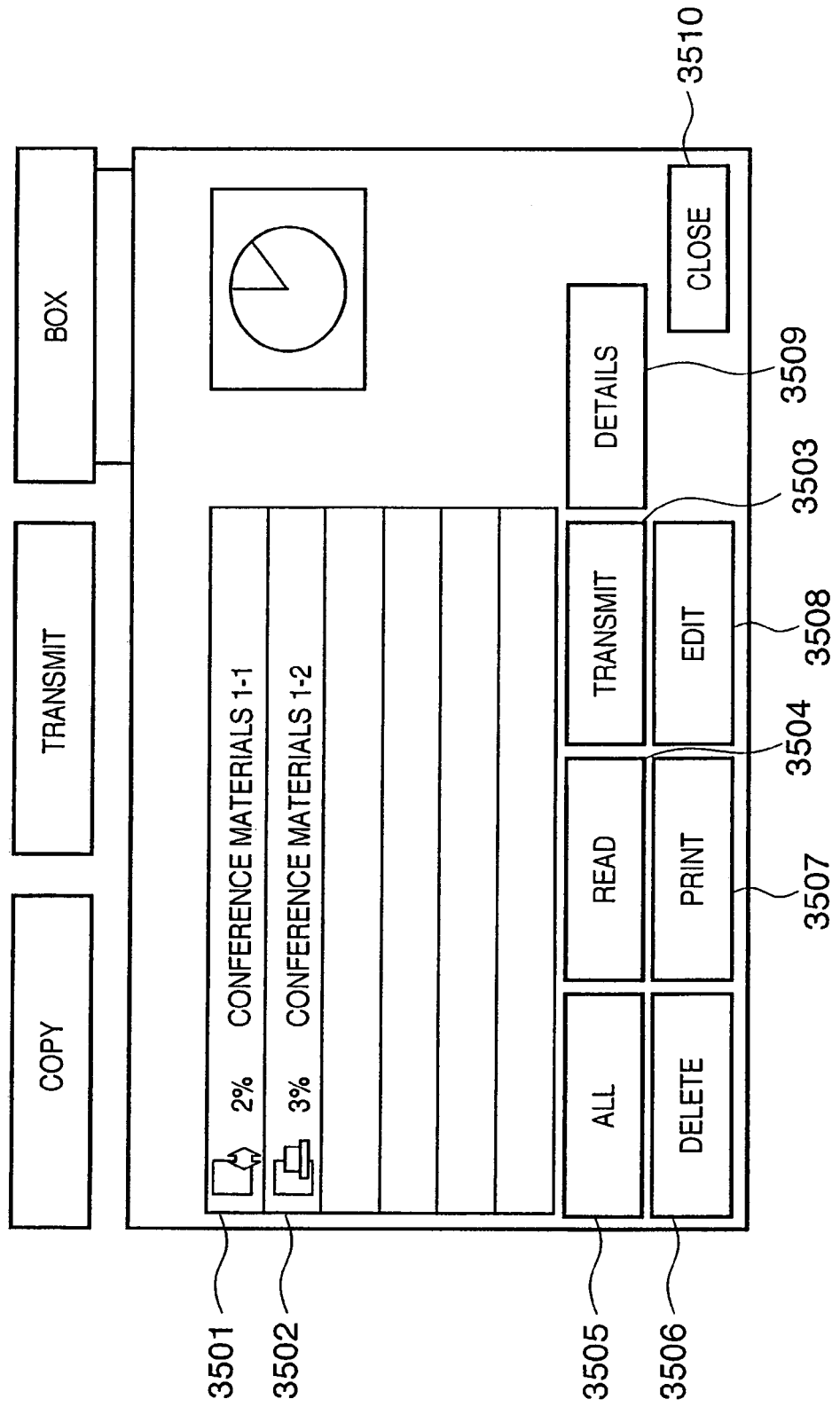
FIG. 23 is a view showing a display example of a window displayed on the display screen of the LCD display unit 2801 when a folder 3401 is designated.

FIG. 23 is a view showing a display example of a window displayed on the display screen of the LCD display unit 2801 when the folder 3401 is designated.

Icons 3501 and 3502 indicate files stored in the folder 3401. Each of the files is, e.g., a document file having a plurality of pages.

The icon 3501 indicates a scanned document file. An icon indicating a scanned document, the ratio of memory use amount of the file with respect to the whole HDD 2004, and a document name arbitrarily set by the user are displayed on the icon 3501. The icon 3502 indicates a PDL document file.

Both icons are highlighted when designated to give an explicit notification of the designation. The user designates a button image 3503 to instruct transmission of a file indicated by a currently selected icon.

The user designates a button image 3504 to instruct the CPU 2001 to make the scanner 2015 execute reading. The user designates a button image 3505 to select all files in the folder 3401. The user designates a button image 3506 to delete a currently selected file. The user designates a button image 3507 to make the printer 2017 print a currently selected file. The user designates a button image 3508 to edit a currently selected file. For example, the user designates the button image 3508 to select two documents and connect and save them as one document or delete a specific page.

The user designates a button image 3509 to display detailed information about a currently selected file. The detailed information contains the resolution, document size, and color/monochrome indicator in addition to the document name.

Figure 24:
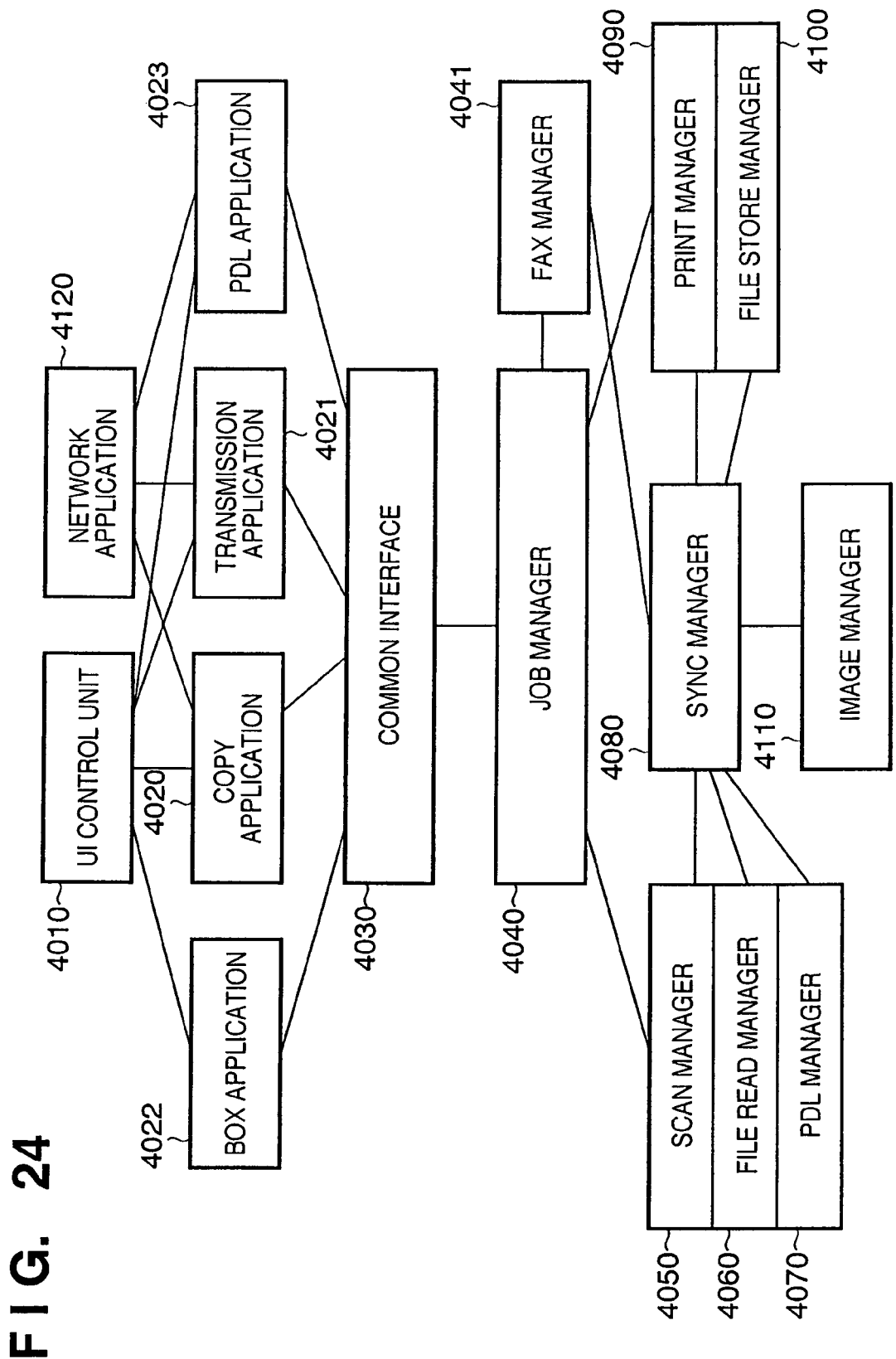
FIG. 24 is a block diagram showing an arrangement example of a software program stored in a ROM 2003.

FIG. 24 is a block diagram showing an arrangement example of a software program stored in the ROM 2003.

A UI (User Interface) control unit 4010 controls the operation unit 2006. A copy application 4020, transmission application 4021, and box application 4022 receive an instruction from the UI control unit 4010 and execute a copy operation, a transmission operation, and scan/printing from a box window, respectively. A PDL application 4023 receives PDL print data from a network application 4120 and issues a PDL print job.

A common interface 4030 absorbs a device dependent part of each device control part. A job manager 4040 arranges job information received from the common interface 4030 and transmits it to a document processing unit in a lower layer.

In local copy, a scan manager 4050 and a print manager 4090 serve as a document processing unit. For a transmission job in remote copy, the scan manager 4050 and a file store manager 4100 serve as a document processing unit. For a reception job in remote copy, a file read manager 4060 and the print manager 4090 serve as a document processing unit. For PDL printing by, e.g., LIPS or PostScript, a PDL manager 4070 and the print manager 4090 serve as a document processing unit.

An image manager 4110 synchronizes the document managers and executes various kinds of image processing. An image processing request is sent to the image manager 4110 via a sync manager 4080. The image manager 4110 executes image processing and image file storage upon scan/printing.

A software process in local copy will be described first. When the user inputs an instruction via the operation unit 2006, the UI control unit 4010 transmits a copy instruction and copy settings to the copy application 4020.

The copy application 4020 transmits, via the common interface 4030, the information from the UI control unit 4010 to the job manager 4040 that controls the device. The job manager 4040 transmits the job information to the scan manager 4050 and print manager 4090. The scan manager 4050 sends a scan request to the scanner 2015.

Simultaneously, the scan manager 4050 sends a scanned image processing request to the image manager 4110 via the sync manager 4080. The image manager 4110 sets the scanner image processing unit 2014 in accordance with the instruction from the scan manager 4050. Upon finishing the setting, the image manager 4110 notifies the scan manager 4050 of completion of scan preparation via the sync manager 4080. The scan manager 4050 sends a scan instruction to the scanner 2015. The image manager 4110 is notified of completion of scanned image transfer by an interrupt signal from hardware (not shown).

The sync manager 4080 receives a scan completion notification from the image manager 4110 and transfers it to the scan manager 4050 and print manager 4090. Simultaneously, the sync manager 4080 instructs the image manager 4110 to create a file of a compression image stored in the RAM 2002 and store the file in the HDD 2004. In accordance with the instruction, the image manager 4110 stores, in the HDD 2004, the image (containing a text/photo determination signal) on the RAM 2002. An SRAM (not shown) stores a color/monochrome determination result, an undercolor removal level for undercolor removal, "scanned image" as the image input source, and color space RGB as the additional information of the image.

The image manager 4110 executes a process of generating image feature amount data together with the storage control process for the HDD 2004. The image manager 4110 sets, in the image processor 2031, the address of image data on the RAM 2002 and parameters such as an image size and color space necessary for image processing. The image bus I/F 2089, decompression unit 2085, and image processor 2031 are activated. The image processor 2031 generates image feature amount data, as described above, and stores it in the RAM 2002 via the image bus I/F 2089.

When the image feature amount data is stored in the RAM 2002, the image manager 4110 registers the image feature amount data in a log file. The log file is saved in the HDD 2004 and has a table format as shown in FIG. 25.

FIG. 25 is a view showing a structural example of a log file. As shown in FIG. 25, the table stores job IDs, job types, data types and data lengths of image feature amount data, and the image feature amount data.

The job manager 4040 generates a job ID without repeating it on the basis of a predetermined logic at the start of job. Each job ID corresponds to a separately held job log. A job type is a numerical value representing, e.g., copy, printing, or transmission.

An image feature amount data type is a value representing a type of image feature amount data. In this embodiment, a value representing DAOF is stored. As a data type, image data itself or a converted image (thumbnail image) with a lower resolution may be stored. An image feature amount data length is the data size of the image feature amount data.

Referring back to FIG. 24, upon ending storage in the HDD 2004 and receiving a scan completion notification from the scanner 2015, the image manager 4110 notifies the scan manager 4050 of completion of file creation via the sync manager 4080. The scan manager 4050 returns an end notification to the job manager 4040. The job manager 4040 returns the notification to the copy application 4020 via the common interface 4030.

When the image is stored in the RAM 2002, the print manager 4090 sends a print request to the printer 2017. Simultaneously, the print manager 4090 sends a print image processing request to the sync manager 4080. Upon receiving the request from the print manager 4090, the sync manager 4080 requests the image manager 4110 to set image processing. The image manager 4110 sets the printer image processing unit 2016 in accordance with the additional information of the image and notifies the print manager 4090 of completion of print preparation via the sync manager 4080.

The print manager 4090 sends a print instruction to the printer 2017. The image manager 4110 is notified of completion of print image transfer by an interrupt signal from hardware (not shown). The sync manager 4080 receives a print completion notification from the image manager 4110 and transfers it to the print manager 4090. The print manager 4090 receives a discharge completion notification from the printer 2017 and returns an end notification to the job manager 4040. The job manager 4040 returns the notification to the copy application 4020 via the common interface 4030. When scan and printing are ended, the copy application 4020 notifies the UI control unit 4010 of the end of job.

For a scan job or transmission job in remote copy, not the print manager 4090 but the file store manager 4100 receives a request from the job manager 4040. When a scanned image is stored in the HDD 2004, the file store manager 4100 receives a storage completion notification from the sync manager 4080. The notification is sent, via the common interface 4030, to the copy application 4020 in remote copy or to the transmission application 4021 in a transmission job.

As in a copy job, the image manager 4110 stores the scanned image in the HDD 2004 and simultaneously registers image feature amount data in a log file. In a transmission job, a numerical value representing "transmission" is registered as the job type. In a remote copy job, a numerical value representing "copy" is registered as the job type.

After receiving the notification, the copy application 4020 or transmission application 4021 requests the network application 4120 to transmit the file stored in the HDD 2004. Upon receiving the request, the network application 4120 transmits the file. The network application 4120 receives setting information about copy from the copy application 4020 at the start of job and sends the information to the device on the remote side.

In remote copy, the network application 4120 executes transmission by using a communication protocol unique to the device. In a transmission job, a standard file transfer protocol such as FTP or SMB is used.

For FAX transmission, the transmission application 4021 sends a transmission instruction to a FAX manager 4041 via the common interface 4030 and job manager 4040 after storage of the file. The FAX manager 4041 negotiates with the partner device via the modem 2050, requests the image manager 4110 to do necessary image processing (color-to-monochrome conversion, multi-valued/binary image conversion, rotation, and scaling), and transmits the converted image via the modem 2050.

If a printer exists at the transmission destination, the transmission application 4021 sends a print instruction via the common interface 4030 as a print job. The operation is the same as for a print job in remote copy to be described below. If the transmission destination is a box in the device, the file store manager 4100 stores the file in the file system of the device.

For FAX reception, the FAX manager 4041 receives an image via the modem 2050 and stores it in the HDD 2004 as an image file. After storage in the HDD 2004, a notification is sent to the box application 4022. The box application 4022 sends a reception print instruction to the job manager 4040 via the common interface 4030. The subsequent operation is the same as that of a normal box print job, and a description thereof will be omitted.

For a print job in remote copy, the network application 4120 saves an image from the transmitting side in the HDD 2004 and issues a job to the copy application 4020. The copy application 4020 inputs the print job to the job manager 4040 via the common interface 4030. Unlike local copy, not the scan manager 4050 but the file read manager 4060 receives the request from the job manager 4040.

A request to rasterize the received image from the HDD 2004 to a memory is sent to the image manager 4110 via the sync manager 4080. The image manager 4110 rasterizes the image on the memory. When rasterization finishes, the image manager 4110 generates image feature amount data and registers the generated image feature amount data in a log file, as in copy. A value representing "print" is registered as the job type. Simultaneously, the image manager 4110 sends a rasterization end notification to the file read manager 4060 and print manager 4090 via the sync manager 4080.

When the image is rasterized on the memory, the print manager 4090 selects a paper feed stage designated by the job manager or a stage having the paper size and sends a print request to the printer 2017. In automatic paper selection, a paper feed stage is selected on the basis of the image size, and a print request is sent. Simultaneously, the print manager 4090 sends a print image processing request to the sync manager 4080. Upon receiving the request from the print manager 4090, the sync manager 4080 requests the image manager 4110 to set print image processing (At this time, for example, if rotation is necessary because of the absence of paper sheets with an optimum size, a rotation instruction is also sent. Upon receiving a rotation instruction, the image manager 4110 causes the rotation unit 2019 to rotate the image).

The image manager 4110 sets the printer image processing unit 2016 and notifies the print manager 4090 of completion of print preparation via the sync manager 4080. The print manager 4090 sends a print instruction to the printer 2017. The image manager 4110 is notified of completion of print image transfer by an interrupt signal from hardware (not shown).

The sync manager 4080 receives a print completion notification from the image manager 4110 and transfers it to the file read manager 4060 and print manager 4090. The file read manager 4060 returns an end notification to the job manager 4040. The print manager 4090 receives a discharge completion notification from the printer 2017 and returns an end notification to the job manager 4040. The job manager 4040 returns the end notification to the copy application 4020 via the common interface 4030. When scan and printing are ended, the copy application 4020 notifies the UI control unit 4010 of the end of job.

For a PDL data rasterization/storage job, a request from the host PC that issues a PDL print job is sent to the PDL application 4023 via the network application 4120. The PDL application 4023 sends the PDL data rasterization/storage job to the job manager 4040 via the common interface 4030. The PDL manager 4070 and file store manager 4100 receive the request from the job manager 4040. The operation of inputting an image after RIP of the image is the same as in the above-described scan job.

Image feature amount data is generated and registered, as in the above-described scan job. A value representing "PDL storage" is registered as the job type. Simultaneously, the image (containing a text/photo determination signal) on the memory is stored in the HDD 2004. An SRAM (not shown) stores color/monochrome information, "PDL image" as the image input source, and color space CMYK or RGB as the additional information of the image.

When the PDL image is stored in the HDD 2004, a storage completion notification is received from the sync manager 4080 and sent to the PDL application 4023 via the common interface 4030. After receiving the notification, the PDL application 4023 notifies the network application 4120 of completion of storage in the HDD 2004 and sends this information to the host PC that has issued the PDL print job. In a PDL print job, the PDL manager 4070 and print manager 4090 prints the image rasterized on the memory.

To print a PDL-rasterized and stored image, the stored document as the print instruction target is issued to the box application 4022 as a print job. The box application 4022 inputs the print job to the job manager 4040 via the common interface 4030. Unlike local copy, not the scan manager 4050 but the file read manager 4060 receives the request from the job manager 4040. A request to rasterize the image as the print instruction target from the HDD 2004 to a memory is sent to the image manager 4110 via the sync manager 4080. The subsequent operation is the same as that described for a remote copy print job, and a description thereof will be omitted.

<Image Search Process>

A process of searching for a desired image as a query in or outside the current apparatus when at least one image data is saved in or outside the current apparatus will be described next.

Figure 6:
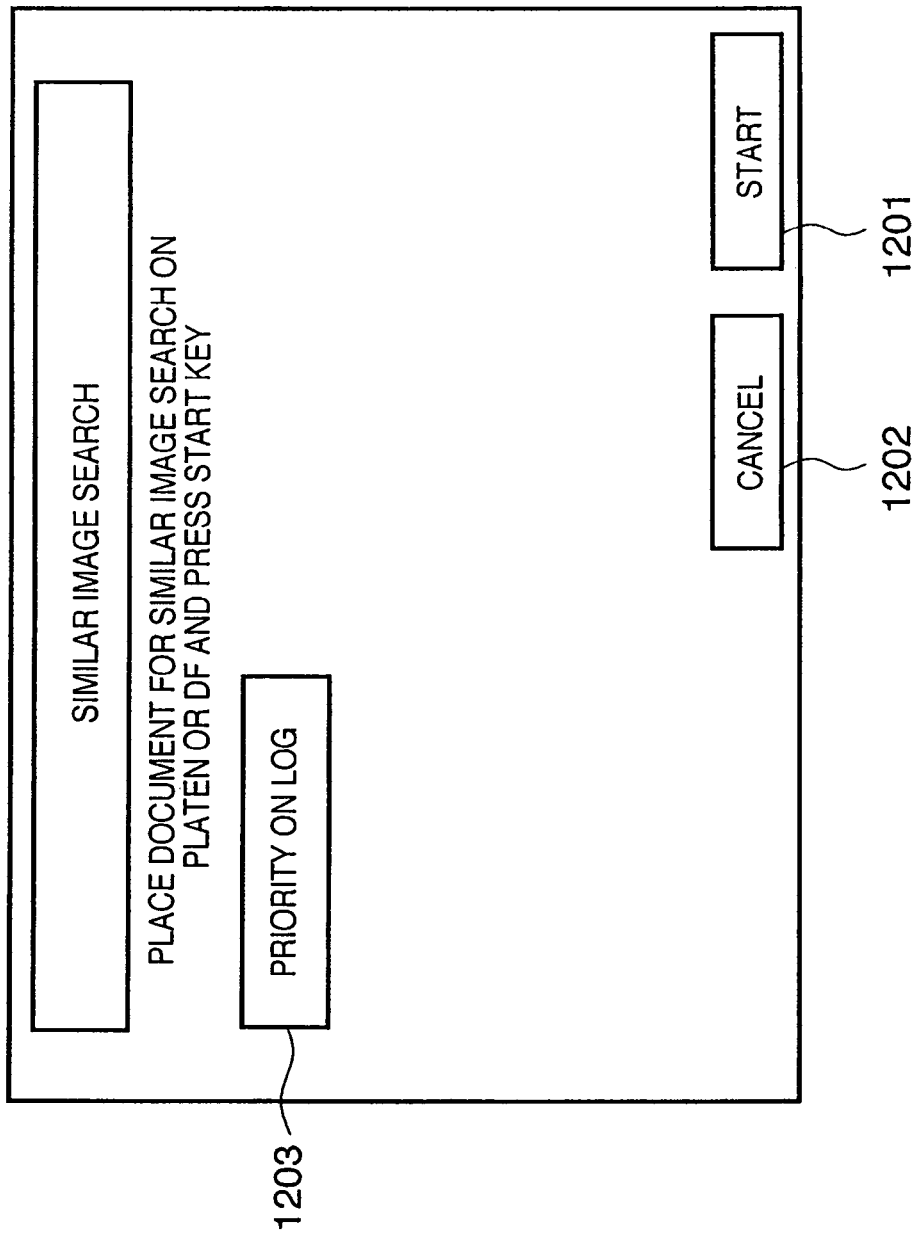
FIG. 6 is a view showing an example of a GUI displayed on the display screen of an LCD display unit 2801 of an operation unit 2006 when the operator of the MFP 1000*a* (1000*b*) inputs an image search instruction via the operation unit 2006.

FIG. 6 is a view showing an example of a GUI displayed on the display screen of the LCD display unit 2801 of the operation unit 2006 when the operator of the MFP 1000a (1000b) inputs an image search instruction via the operation unit 2006.

The window shown in FIG. 6 promotes the operator of the apparatus to input an image serving as a query to the apparatus. The operator watches this window and sets, on the feeder 2701, a printing medium such as a paper sheet in which an image serving as a query is printed.

When the operator designates a start button image 1201, the CPU 2001 controls the scanner 2015 and causes it to read the image printed on the printing medium. After reading, an image search process to be described later is executed.

Figure 7:
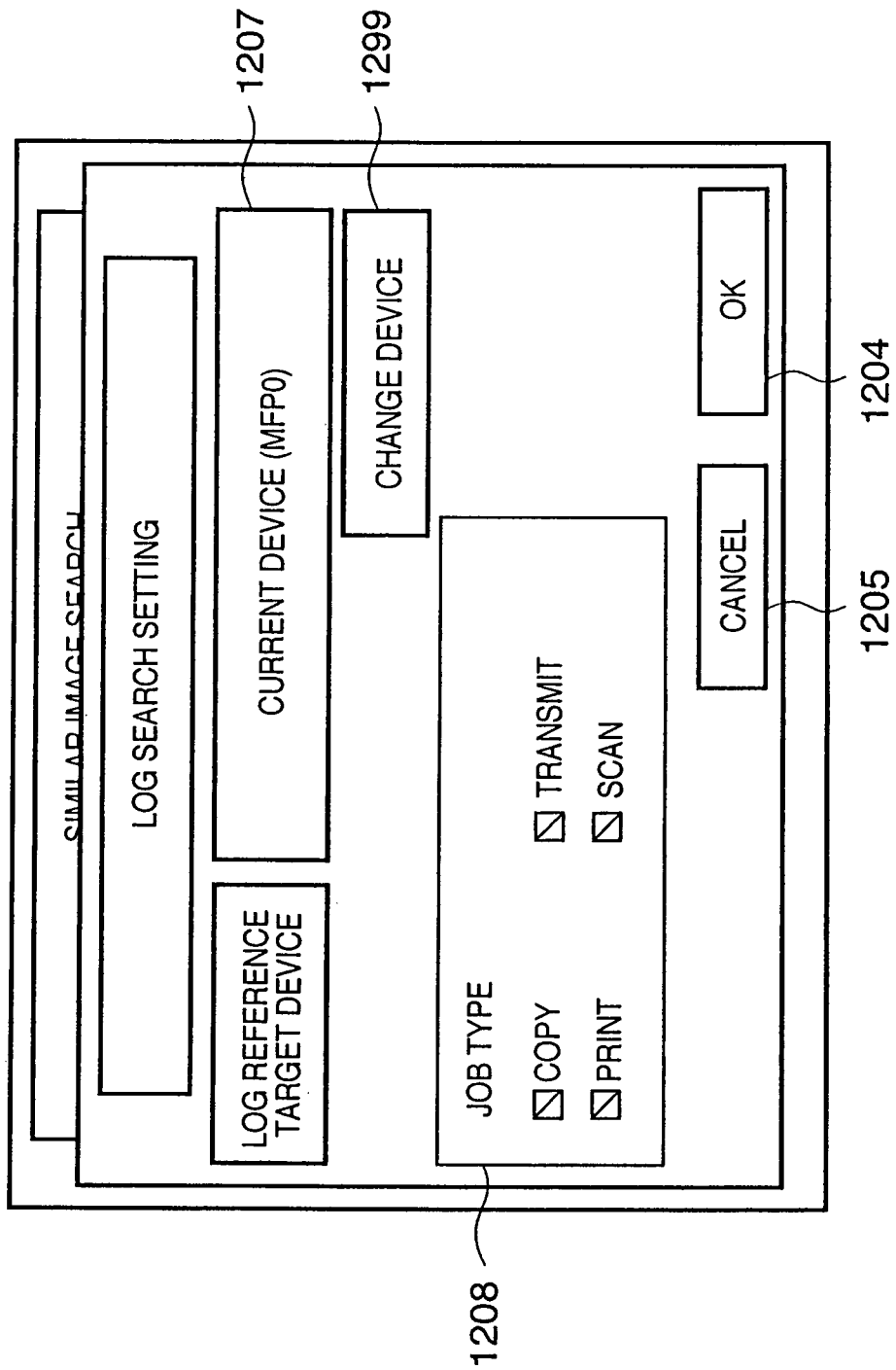
FIG. 7 is a view showing an example of a setting window in image search using a job log (log data of images that have undergone processes such as copy and printing in the past)

When the operator designates a button image 1203, a GUI shown in FIG. 7 is displayed on the display screen of the LCD display unit 2801. FIG. 7 is a view showing an example of a setting window in image search using a job log (log data of images that have undergone processes such as copy and printing in the past).

Figure 8:
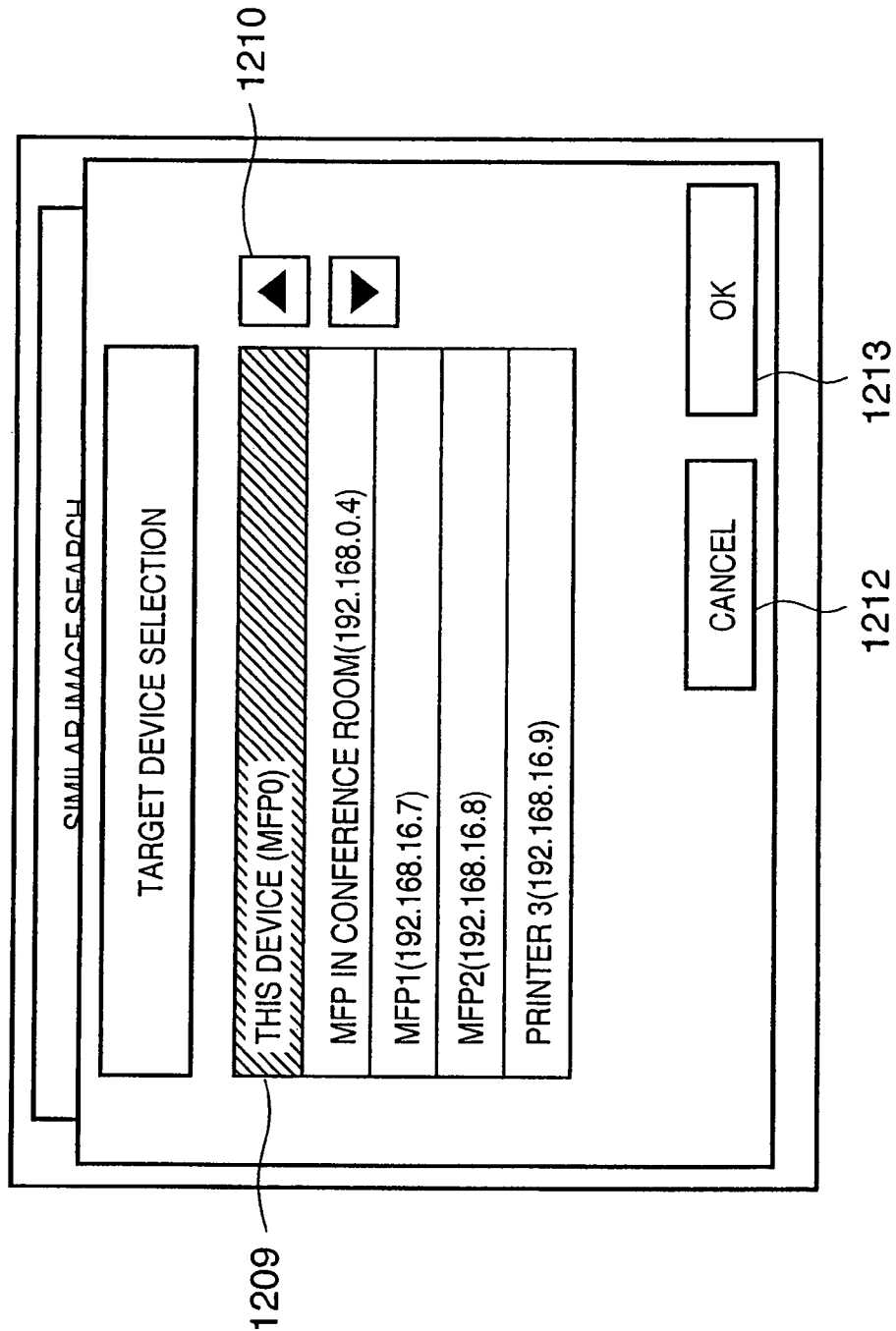
FIG. 8 is a view showing an example of a window that displays a list of information about devices (e.g., MFP, printer, scanner, and FAX) capable of data communication with the apparatus.

When the operator designates a button image 1299, a GUI shown in FIG. 8 is displayed on the display screen of the LCD display unit 2801. FIG. 8 is a view showing an example of a window that displays a list of information about devices (e.g., MFP, printer, scanner, and FAX) capable of data communication with the apparatus. A region 1209 displays a list of information about devices capable of data communication with the apparatus.

If the pieces of information about all devices are not displayed in the region 1209, the pieces of information displayed in the region 1209 can be scrolled by using a vertical scroll button 1210. Hence, the operator can browse the pieces of information about all devices in the region 1209. As shown in FIG. 8, a device name and an IP address on the network 1004 are displayed as information about a device. The user of the apparatus can freely change the device names.

When the operator browses the information, selects a desired device, and designates a button image 1213, the LCD display unit 2801 returns to the window shown in FIG. 7. A region 1207 displays the name of the selected device as the name of the log reference target device. In image search, the display order of image search results is determined on the basis of the job log of the selected device (for example, images handled in that device are preferentially displayed). In this embodiment, the target is one device. However, the target may include the job logs of a plurality of devices.

When the operator designates a cancel button image 1212 in the GUI shown in FIG. 8, the LCD display unit 2801 returns to the window in FIG. 7 without changing the setting.

In the GUI shown in FIG. 7, a region 1208 displays job types usable as the log reference target. Each job type has a check box. Job types with check marks are included in the reference target. The check box is of a toggle type that is turned on/off by user's click. When the check mark of a job type is turned off, the log of the job type is not referred to. When the operator designates a button image 1205 in the GUI shown in FIG. 7, the LCD display unit 2801 returns to the window in FIG. 6 without changing the setting. When the operator designates a button image 1204, the items set in the window in FIG. 7 are set, and the LCD display unit 2801 returns to the window in FIG. 6. When setting is done to execute search on the basis of a job log, it is preferable to notify the user that setting is already done by, e.g., changing the display color of the button image 1203 or displaying a set mark.

Figure 2:
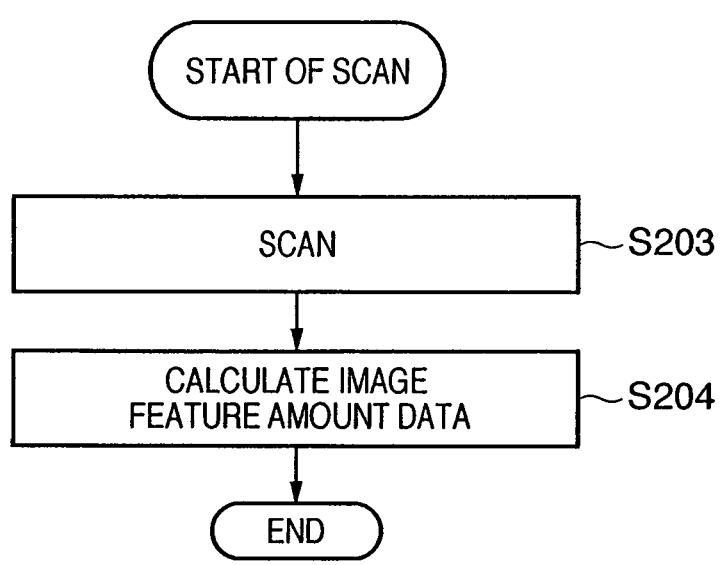
FIG. 2 is a flowchart of a process executed by an apparatus to input an image serving as a query to an MFP 1000*a* (MFP 1000*b*)

FIG. 2 is a flowchart of a process executed by the apparatus to input an image serving as a query to the MFP 1000a (MFP 1000b). The ROM 2003 stores a program and data to cause the CPU 2001 to execute the process according to the flowchart in FIG. 2. The program and data are loaded to the RAM 2002 as needed under the control of the CPU 2001. The CPU 2001 executes the process by using the loaded program and data so that the apparatus executes the processes to be described below. This also applies to the flowcharts shown in FIGS. 3 to 5.

Upon detecting that the button image 1201 is designated in the GUI shown in FIG. 6 displayed on the display screen of the LCD display unit 2801, the CPU 2001 controls the scanner 2015 in step S203. An image printed on a printing medium (an image obtained by scanning a paper document) is acquired as a query. The scanner image processing unit 2014 processes the acquired image data serving as a query and stores it in the RAM 2002, as described above.

Figure 3:
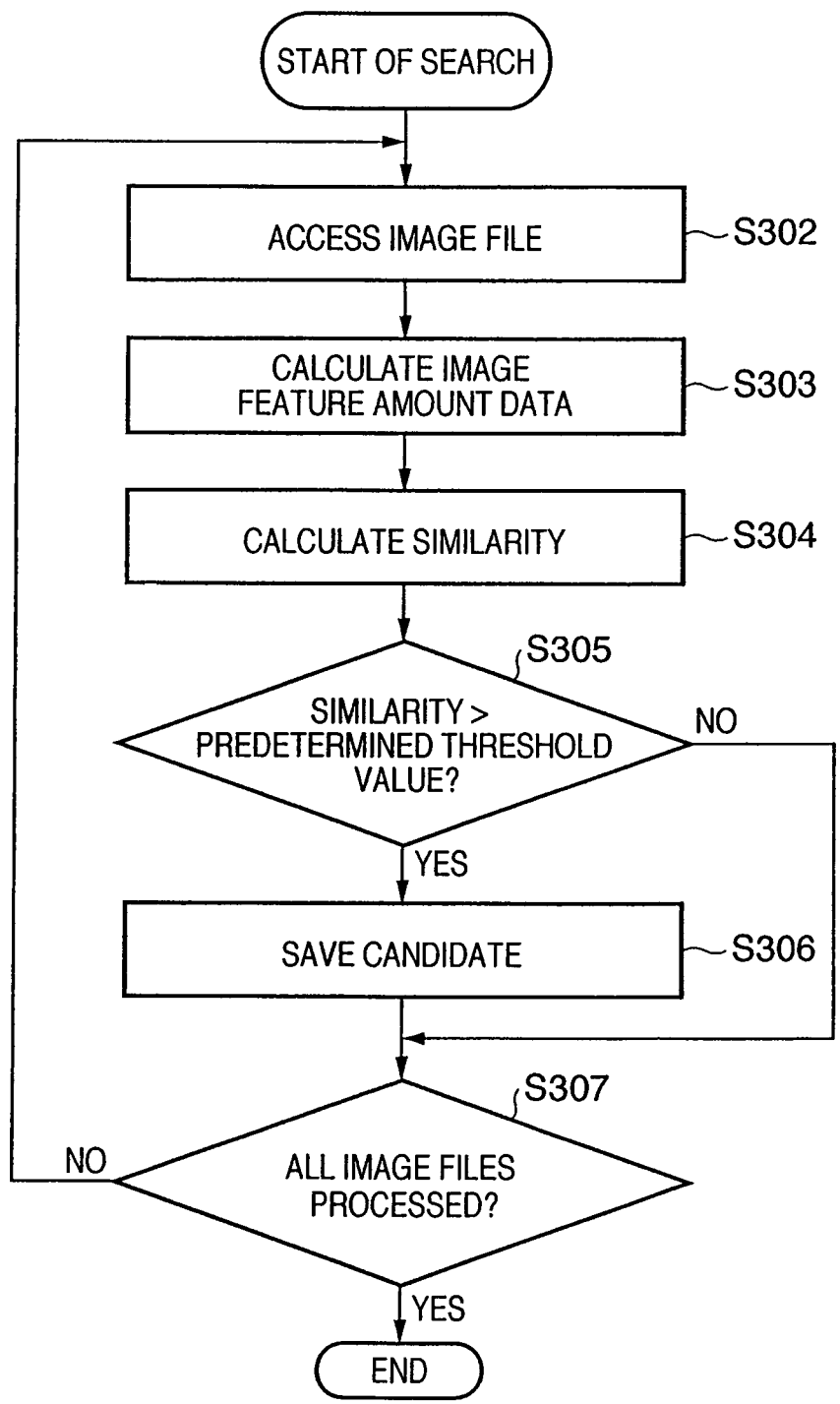
FIG. 3 is a flowchart of an image search process using the image acquired in the flowchart of FIG. 2 as a query.

In step S204, the CPU 2001 controls the image processor 2031. The image processor 2031 generates image feature amount data corresponding to the image data. Then, a process according to the flowchart in FIG. 3 is executed. In this example, an image serving as a query is acquired by scan. The image acquisition form is not particularly limited. An image saved in the HDD 2004 in advance may be acquired. Alternatively, an image may be acquired from another apparatus via the network 1004.

FIG. 3 is a flowchart of an image search process using the image acquired in the flowchart of FIG. 2 as a query.

In step S302, the CPU 2001 downloads, to the RAM 2002, one image data from the storage device as the search target. Note that if image feature amount data is stored in the search target device, the CPU 2001 may download it first and, and after the image is determined as a candidate, download the actual image. The search target devices include the plurality of devices connected via the network. The target may be a device designated in advance or only the document management server that manages document images.

In step S303, the image feature amount data of the downloaded image data is generated. In step S304, the similarity between the image feature amount data generated in step S303 and the image feature amount data of the image data serving as a query generated in step S204 is calculated. The process of calculating the similarity can use a technique disclosed in, e.g., Japanese Patent Laid-Open No. 2004-348706. For example, the similarity of corresponding data of each attribute is calculated between the image feature amount data. The final similarity is obtained by totalizing the similarities obtained for the respective attributes.

Any other data can be used as image feature amount data. Image data disclosed in, e.g., Japanese Patent Application No. 2005-244684 may be used. In this case, the similarity between the image key of the image data serving as a query and the image key obtained in step S330 is calculated.

As the image feature amount data, a thumbnail image with a lower resolution of about 300 dpi may be used. In this case, the similarity between the thumbnail image of the image data serving as a query and the thumbnail image obtained in step S303 is calculated. The method of calculating the similarity between images is known, and a description thereof will be omitted.

In step S305, it is checked whether the similarity obtained in step S304 is larger than a predetermined threshold value. If the similarity is smaller than or equal to the predetermined threshold value, the process advances to step S307. If the similarity is larger than the predetermined threshold value, the process advances to step S306.

In step S306, the image downloaded in step S302 is saved as a search result candidate. The downloaded image data, the address (e.g., URL or IP address) of the download source device of the downloaded image, and the image feature amount data of the downloaded image data are held in the RAM 2002.

In step S307, it is checked whether the search process is done for all search target devices. If NO in step S307, the process returns to step S302 to repeat the above-described process for an image that is not downloaded yet. If the search process is done for files in all search target devices, the process is ended, and a process according to the flowchart in FIG. 5 is executed.

In the flowchart of FIG. 3, the device that holds image data does not hold corresponding image feature amount data. However, in registering an image in the device, the image feature amount of the image may be obtained and registered in association with the image. In this case, the process in step S303 is unnecessary.

Figure 5:
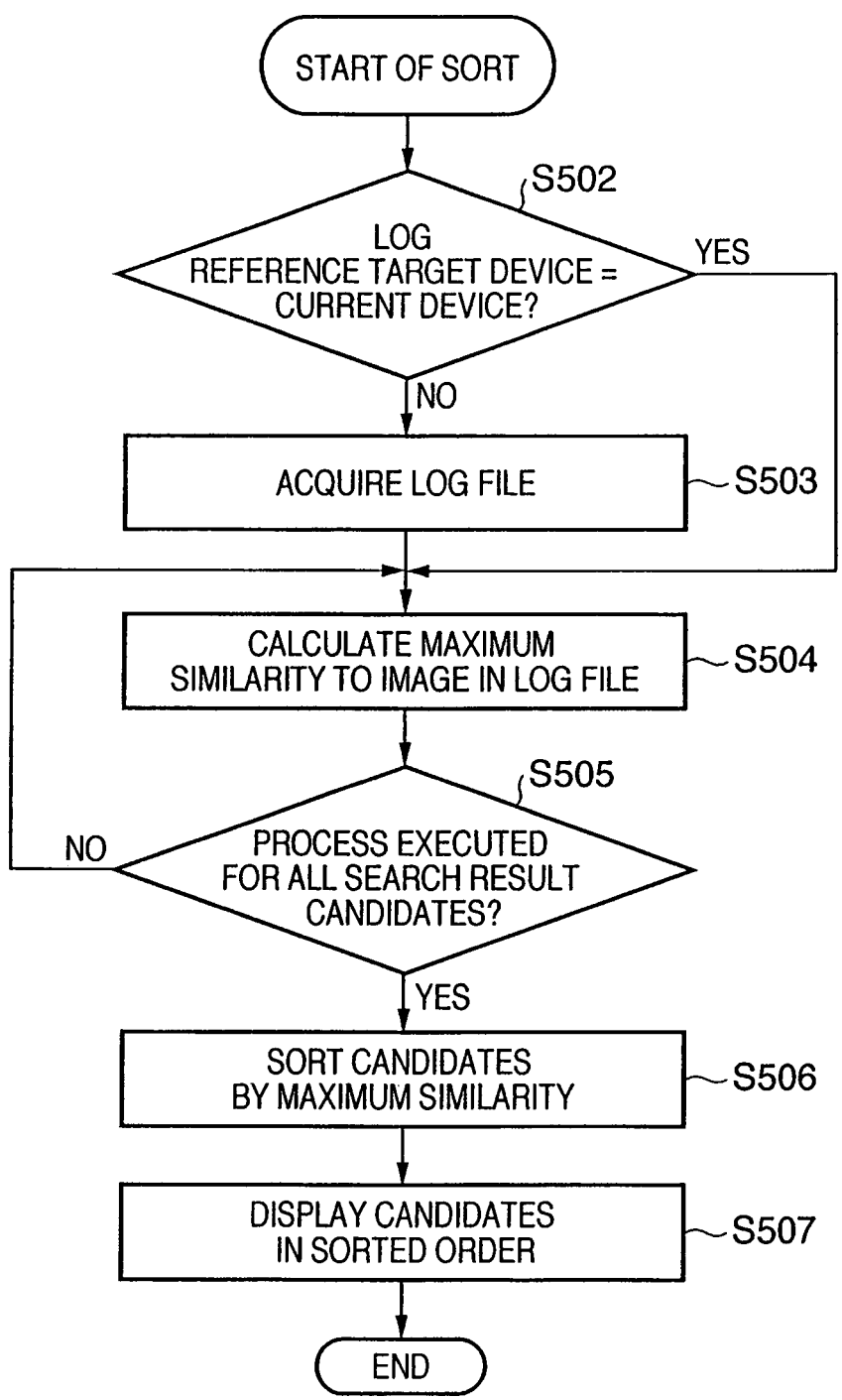
FIG. 5 is a flowchart of a process of displaying a result obtained when, of images as search result candidates in the flowchart of FIG. 3, images that satisfy conditions are sorted by similarity.

FIG. 5 is a flowchart of a process of displaying a result obtained when, of images as search result candidates in the flowchart of FIG. 3, images that satisfy conditions are sorted by similarity. In step S502, it is checked whether the device selected by using the button image 1299 in FIG. 7 and the window in FIG. 8 is the current device. If YES in step S502, a log file (job log information) in itself is acquired, and the process advances to step S504. If NO in step S502, the process advances to step S503 to acquire, from the selected device, a log file held in it.

Figure 4:
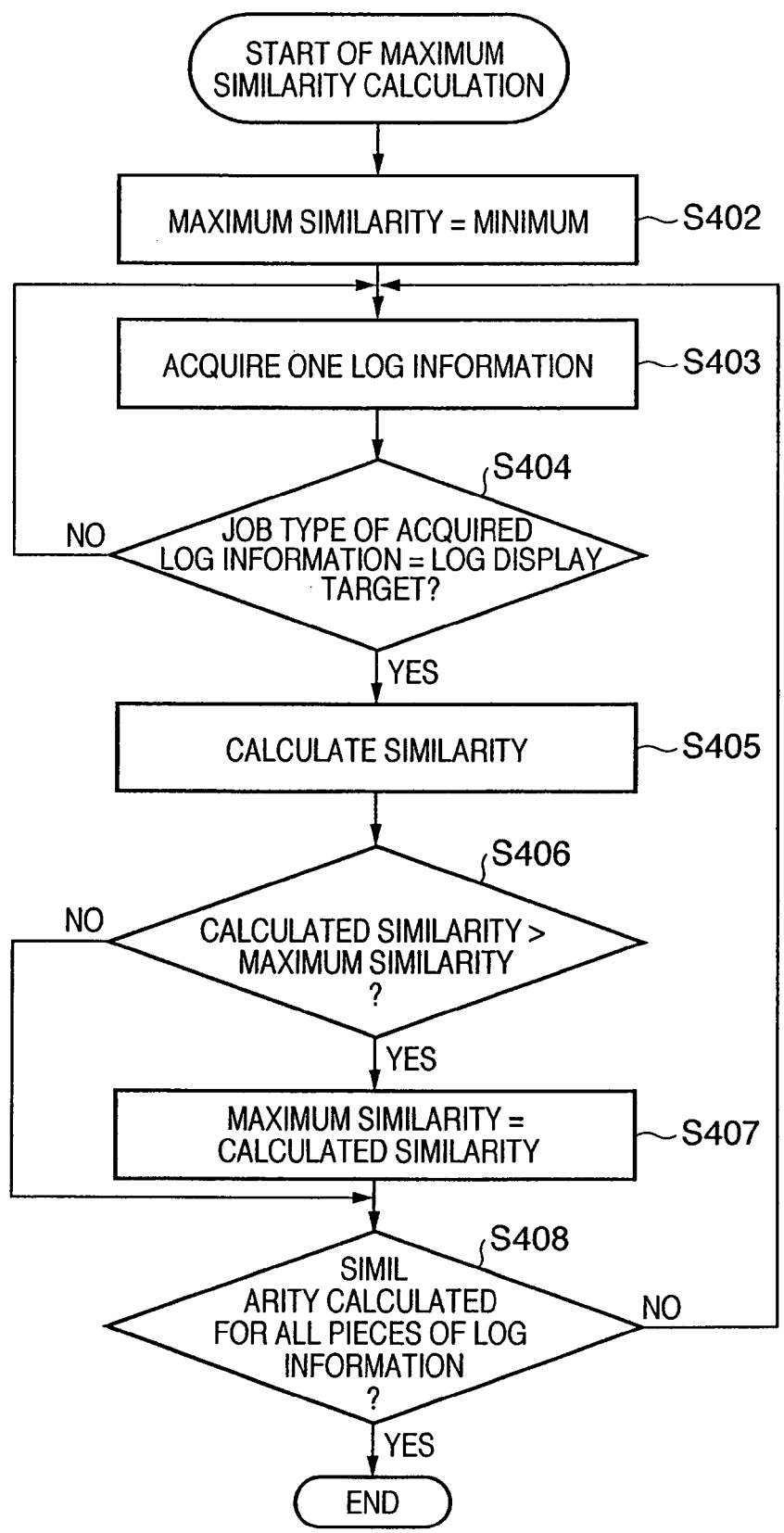
FIG. 4 is a flowchart illustrating details of a process in step S504.

In step S504, the process according to the flowchart in FIG. 4 is executed for one of the search result candidates saved in step S306. FIG. 4 is a flowchart illustrating details of the process in step S504.

In step S402, the "maximum similarity" used in the following process is initialized to a minimum value (e.g., 0). In step S403, a job type corresponding to one image feature amount data is acquired from the log file. In step S404, it is checked whether the acquired job type is included in the job types with marks in the check boxes in the region 1208 on the GUI shown in FIG. 7.

If the job type has no check mark, the process returns to step S403 to acquire a job type corresponding to another image feature amount data. If the job type has a check mark, the process advances to step S405 to calculate the similarity between the image feature amount data corresponding to the acquired job type and the image feature amount data of one of the search result candidates saved in step S306.

In step S406, it is checked whether the obtained similarity is larger than the maximum similarity. If the similarity is equal to or smaller than the maximum similarity, the process advances to step S408. If the similarity is larger than the maximum similarity, the process advances to step S407 to set the similarity obtained in step S405 as the maximum similarity.

In step S408, it is checked whether the above-described process is done for all image feature amount data registered in the log file. If YES in step S408, the process is ended. One of the search result candidates as the target and the maximum similarity are stored in association with each other. If NO in step S408, the process returns to step S403 to acquire the next log information.

Referring back to FIG. 5, in step S505, it is checked whether the process in step S504 is done for all search result candidates. If the process is not executed yet for all search result candidates, the process returns to step S504 to execute the process in step S504 for an unprocessed search result candidate.

If the process is executed for all search result candidates, the process advances to step S506. In step S506, the images of the search result candidates obtained and stored in FIG. 4 are sorted in descending order of maximum similarities. The images are displayed in this order on the display screen of the LCD display unit 2801. Instead of displaying only the images, information about each image such as a file name may also be displayed. Alternatively, a thumbnail of each image may be generated and displayed.

As described above, according to this embodiment, especially when search by the similarities of images is executed, it is possible to preferentially present, to the operator, images having an input/output log (log of copy, scan, or printing) in a log reference target device from a number of search results.

In many cases, the operator remembers the device that has input or output a search target document. Hence, when the operator can designate, for search, the device that has input or output an image, desired images can be displayed preferentially so that the image search efficiency can be improved.

The image input/output device designated by the operator may be the device used for the search or another image input/output device connected to the network. For another image input/output device connected to the network, the list of image feature amount data is acquired via the network, and search results are rearranged by using the list.

The operation mode upon inputting or outputting an image is recorded in the image feature amount data list. An operation mode indicates an operation such as copy, print output from a PC, or file transmission by an image input/output device. The operator designates an operation mode to preferentially display an image input/output in that operation mode so that the image is displayed at a higher rank of the search results.

The effects of the above-described embodiment will be summarized. An MFP capable of data communication with a storage device (the MFP itself or another device) that holds at least one image obtains the feature amount of an image serving as a query. A calculation process is executed to obtain the similarity between the feature amount of each image held in the storage device and the feature amount of the image serving as a query.

A second calculation process is executed to obtain the similarity between, of the feature amounts of the images held in the storage device, each of feature amounts whose similarities with respect to the image serving as a query are equal to or larger than a threshold value and the feature amount of an image recorded in the job log (log of processes executed in the past). Of the feature amounts of the images held in the storage device, images (candidate images) having feature amounts whose similarities with respect to the image serving as a query are equal to or larger than the threshold value and information about the images are displayed in descending order of similarities obtained by the second calculation process.

The object of the present invention is also achieved by the following method. A recording medium (or storage medium) which records software program codes to implement the functions of the above-described embodiment is supplied to a system or apparatus. The computer (or CPU or MPU) of the system or apparatus reads out and executes the program codes stored in the recording medium. In this case, the program codes read out from the recording medium themselves implement the functions of the above-described embodiment. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiment.

The program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiment.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-331134 filed Dec. 7, 2006, which is hereby incorporated by reference herein in its entirety.

What is claimed is:

1. An image processing apparatus comprising: a first calculation unit constructed to calculate a feature amount of a query image serving as a query;
a second calculation unit constructed to calculate a first similarity between a feature amount of each image stored in a storage device and the feature amount calculated by said first calculation unit, thereby obtaining a plurality of candidate images similar to the query image based on the calculated first similarity;
a selection unit constructed to select a device as a reference target when an image search process is instructed; and
a display order determination unit constructed to determine a display order of the plurality of candidate images obtained by said second calculation unit according to second similarities between each of the plurality of candidate images and images processed in the past by the device selected as the reference target, the second similarities being calculated on the basis of a log of the device selected as the reference target, the log containing data of at least one process performed on image data in the past by the device selected as the reference target, wherein the second similarities are different from the first similarity.

2. The apparatus according to claim 1, wherein the log contains data about feature amounts of the images processed in the past by the device selected as the reference target, and said display order determination unit determines the display order of the plurality of candidate images according to the second similarities between a feature amount of each of the plurality of candidate images and the feature amounts of the images contained in the log.

3. The apparatus according to claim 1, wherein said selection unit selects the device as the reference target based on a user's operation when the image search process is instructed.

4. The apparatus according to claim 1, further comprising a display unit constructed to display at least either of the candidate images and information about the candidate images in accordance with the display order determined by said display order determination unit.

5. An image processing method executed by an image processing apparatus, comprising:
a first calculation step of calculating a feature amount of a query image serving as a query;
a second calculation step of calculating a first similarity between a feature amount of each image stored in a storage device and the feature amount calculated in the first calculation step, thereby obtaining a plurality of candidate images similar to the query image based on the calculated first similarity;
a selection step of selecting a device as a reference target when an image search process is instructed; and
a display order determination step of determining a display order of the plurality of candidate images obtained in the second calculation step according to second similarities between each of the plurality of candidate images and images processed in the past by the device selected as the reference target, the second similarities being calculated on the basis of a log of the device selected as the reference target in the selection step, the log containing data of at least one process performed on image data in the past by the device selected as the reference target, wherein the second similarities are different from the first similarity.

6. A non-transitory computer-readable storage medium for retrievably storing a computer-executable program that causes a computer to execute an image processing method of claim 5.

7. The apparatus according to claim 1, wherein the log of each process is job information indicating a job performed on image data in the past by the device selected as the reference target, and wherein the log further contains image feature amount data corresponding to each job information.

8. The apparatus according to claim 7, wherein the job information indicates at least one of a copy job, a print job, a scan job and a transmit job performed on image data in the past by the device selected as the reference target.

9. The method according to claim 5, wherein the log of each process is job information indicating a job performed on image data in the past by the device selected as the reference target, and wherein the log further contains image feature amount data corresponding to each job information.

10. The method according to claim 9, wherein the job information indicates at least one of a copy job, a print job, a scan job and a transmit job performed on image data in the past by the device selected as the reference target.

* * * * *